United States Patent
Hussain et al.

(10) Patent No.: US 6,816,720 B2
(45) Date of Patent: Nov. 9, 2004

(54) CALL-BASED PROVISIONING OF MOBILE EQUIPMENT LOCATION INFORMATION

(75) Inventors: Tahir Hussain, Dallas, TX (US); Kiran Harpanhalli, Richardson, TX (US)

(73) Assignee: Ericsson Inc., Plano, TX (US)

(*) Notice: Subject to any disclaimer, the term of this patent is extended or adjusted under 35 U.S.C. 154(b) by 441 days.

(21) Appl. No.: 09/862,215

(22) Filed: May 21, 2001

(65) Prior Publication Data

US 2002/0037750 A1 Mar. 28, 2002

Related U.S. Application Data

(63) Continuation-in-part of application No. 09/755,948, filed on Jan. 5, 2001, and a continuation-in-part of application No. 09/755,360, filed on Jan. 5, 2001, and a continuation-in-part of application No. 09/753,947, filed on Jan. 5, 2001, and a continuation-in-part of application No. 09/755,959, filed on Jan. 5, 2001, which is a continuation-in-part of application No. 09/759,942, filed on Jan. 5, 2001.

(60) Provisional application No. 60/235,142, filed on Sep. 22, 2000.

(51) Int. Cl.[7] .............................................. H04M 11/04
(52) U.S. Cl. ............................... 455/404.2; 455/456.1; 455/466
(58) Field of Search ........................ 455/404.1, 404.2, 455/414.1, 415, 456.1, 456.5, 456.6, 466, 456.3

(56) References Cited

U.S. PATENT DOCUMENTS

| | | | |
|---|---|---|---|
| 5,479,482 A | 12/1995 | Grimes | |
| 5,559,520 A | 9/1996 | Barzegar et al. | 342/357 |
| 5,561,704 A | 10/1996 | Salimando | 379/58 |
| 5,926,108 A | 7/1999 | Wicks et al. | 340/825.44 |
| 5,930,699 A | 7/1999 | Bhatia | 455/414 |
| 6,067,017 A | 5/2000 | Stewart et al. | |
| 6,091,956 A | 7/2000 | Hollenberg | 455/456 |
| 6,108,533 A | 8/2000 | Brohoff | 455/414 |
| 6,115,611 A | 9/2000 | Kimoto et al. | 455/456 |
| 6,131,028 A | 10/2000 | Whitington | 455/435 |
| 6,198,914 B1 | 3/2001 | Saegusa | |

FOREIGN PATENT DOCUMENTS

| | | | | |
|---|---|---|---|---|
| DE | 198 17 962 A | | 10/1999 | |
| WO | WO 9723104 A1 | * | 6/1997 | ............ H04Q/7/22 |
| WO | 99 56144 A | | 11/1999 | |

* cited by examiner

Primary Examiner—Quochien B. Vuong

(57) ABSTRACT

Methods, systems, and arrangements enable a mobile equipment (ME) to provide notification when a preselected number is called. In accordance with certain embodiments, upon the calling of a preselected number, the ME sends a notification to the network in addition to setting up a voice call to the dialed number. Preselected number(s) may include emergency numbers (e.g., "911"), portal-defined numbers, etc. The notification may include dialed digits, time of call, and/or location information originating from the ME. When location information is included with the notification, the location information may be forwarded to the portal for further processing and possible additional transmission. Also, location information from the notification can reduce response time and signaling capacity usage when the network responds to an inquiry regarding location from an emergency service provider.

24 Claims, 22 Drawing Sheets

CALL-BASED PROVISIONING OF MOBILE EQUIPMENT LOCATION INFORMATION

CROSS-REFERENCE TO RELATED APPLICATIONS

This U.S. Nonprovisional Application Patent claims the benefit of priority from, and hereby incorporates by reference the entire disclosure of, co-pending U.S. Provisional Application for Patent Serial No. 60/235,142, filed Sep. 22, 2000.

This U.S. Nonprovisional Application for Patent is a Continuation-in-Part of U.S. Nonprovisional Applications for Pat. Ser. Nos. 09/755,942, 09/755,939, 09/755,947, 09/755,360, and 09/755,948, all of which were filed on Jan. 5, 2001. U.S. Nonprovisional Applications for Pat. Ser. Nos. 09/755,942, 09/755,939, 09/755,947, 09/755,360, and 09/755,948 are hereby incorporated by reference in their entirety herein.

BACKGROUND OF THE PRESENT INVENTION

1. Field of the Invention

The present invention relates generally to a value-added information-exchanging network service, and in particular, by way of example but not limitation, to a Business-to-Business (B2B) engine capable of interfacing with both a telecommunications network and a service provider for facilitating information interexchange therebetween.

2. Background and Objects of the Present Invention

The growing accessibility of information on the Internet has made a great variety of content available. Typically, users access this content at a fixed home or office site through an Internet Service Provider (ISP). Content providers on the Internet forward their content, along with advertisements or other commercial information, through the ISP directly to the user. Whereas, some ISPs currently maintain cache, e.g., Yahoo and America On Line (AOL) by providing additional content, most ISPs are purely conduits of information, and as such are not expected to have increased value as this technology and service matures.

A concurrent, more recent development is wireless Internet access by mobile phone users. Due to the convergence of telecommunications and the Internet, a growing variety of devices are becoming multipurpose and are now available to access the Internet wirelessly, e.g., cell phones, personal data assistants (PDAs) or other communications devices. As with ISPs, however, Internet content providers are using existing telecommunications equipment as a mere conduit for passing information therethrough, thereby marginalizing the perceived value of these physical connections owned by the telecommunications operators. This paradigm of operation is illustrated in FIG. 1 and is generally designated therein by the reference numeral 100, where a number of content providers, e.g., restaurant information 105, weather information 110 and other such portals 115, channel the respective data through a "pipe", i.e., the telecom operators' equipment 120, to a realtime user.

In view of the high cost of telecommunications network infrastructure and the need to avoid perceived obsolescence, telecommunications system operators must restructure the interface between the content provider and user to better exploit advantages in the technological convergence. In particular, a system and methodology offering an alternative paradigm avoiding the marginalization of the telecommunications infrastructure and services and avoiding loss of identity is needed. In addition, the paradigm 100 of FIG. 1 fails to make use of any realtime information which is inherently provided within a serving telecommunications network, such as location status, pertaining to the mobile subscriber, an area which will be critical in numerous future applications.

Exemplary prior art methods related to the location and information provided to and from a mobile station includes U.S. Pat. No. 5,559,520 which generally describes tracking the location change of a user using a GPS system and providing information from a dispatcher to the user regarding a vehicle's geographic coordinates.

U.S. Pat. No. 5,926,108 generally describes providing movie information to a pager. The pager first request information from the system, which in turn determines the pager's location and sends movie information based on his location and optionally reserve tickets for the pager user.

U.S. Pat. No. 6,131,028 generally describes providing a specific predefined feature based on a user geographic location. These features could be location-based call forwarding or predefined business establishment directions.

U.S. Pat. No. 5,930,699 generally describes providing information about a business based on a location of a mobile station. The cell identity is determined by the system and information regarding a business in that area is sent to the mobile station.

U.S. Pat. No. 6,091,956 generally describes a system that provides services about places and events a mobile computer encounters in their current location or potential destinations. The mobile computer is informed of events related to places the user is willing to visit. Based on this information, the mobile computer may respond, avoid entirely, communicate with other people, or modify his plans in view of such events.

U.S. Pat. No. 6,108,533 generally describes providing a mobile station with ability to search, using keywords, information in a database. Such information might require the knowledge of the location of the mobile station and search for the keyword provided by the mobile station in that area location database.

U.S. Pat. No. 6,115,611 generally describes having an information center connected to a plurality of mobile terminals. The mobile terminals accessing location information as well as other information helpful to the mobile terminal user from the information center. The information center is used for accumulating information and/or services from the mobile terminals and providing information to the mobile terminal related to the mobile terminal location information.

It is, therefore, an object of certain embodiment(s) of the present invention to provide a new system, scheme, and/or methodology for mobile Internet usage, which offer more value to the telecommunications network operators and better exploit technological advantages of the network.

It is a further object that the system, scheme, and/or methodology of certain embodiment(s) of the present invention better utilize the realtime information available in telecommunications networks about mobile subscribers and the content available, thereby leveraging the network capabilities to generate revenue.

It is another object of certain embodiment(s) of the present invention that an enabler described herein leverage the realtime capabilities of a telecommunications network.

It is an additional object of certain embodiment(s) of the present invention that an enabler be capable of better personalizing services based upon user situation, e.g., user location, user status, etc.

SUMMARY OF THE INVENTION

Methods, systems, and arrangements enable a mobile equipment (ME) to provide notification when a preselected number is called. In accordance with certain embodiment(s), upon the calling of a preselected number, the ME sends a notification to the network in addition to initiating a voice call to the dialed number. Preselected number(s) may include emergency numbers (e.g., "911"), numbers received from a portal and defined by a subscriber, etc. The notification may include dialed digits, time of call, and/or location information originating from the ME. When location information is included with the notification, the location information may be forwarded to the portal for further processing and possible additional transmission to, for example, the defining subscriber. Also, location information from the notification can reduce response time and signaling capacity usage when the network responds to a location inquiry from an emergency service provider.

BRIEF DESCRIPTION OF THE DRAWINGS

The disclosed invention will be described with reference to the accompanying drawings, which show important examplary embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features/embodiment(s) but not to others.

The present invention sets forth a system and methodology for providing personalized, customizable intelligent information and associated services to mobile subscribers based on the mobile subscribers'realtime information, including but not limited to the mobile subscriber's current activity, preferences, location, usage and behavior patterns inherent in realtime networks.

Figure 1:
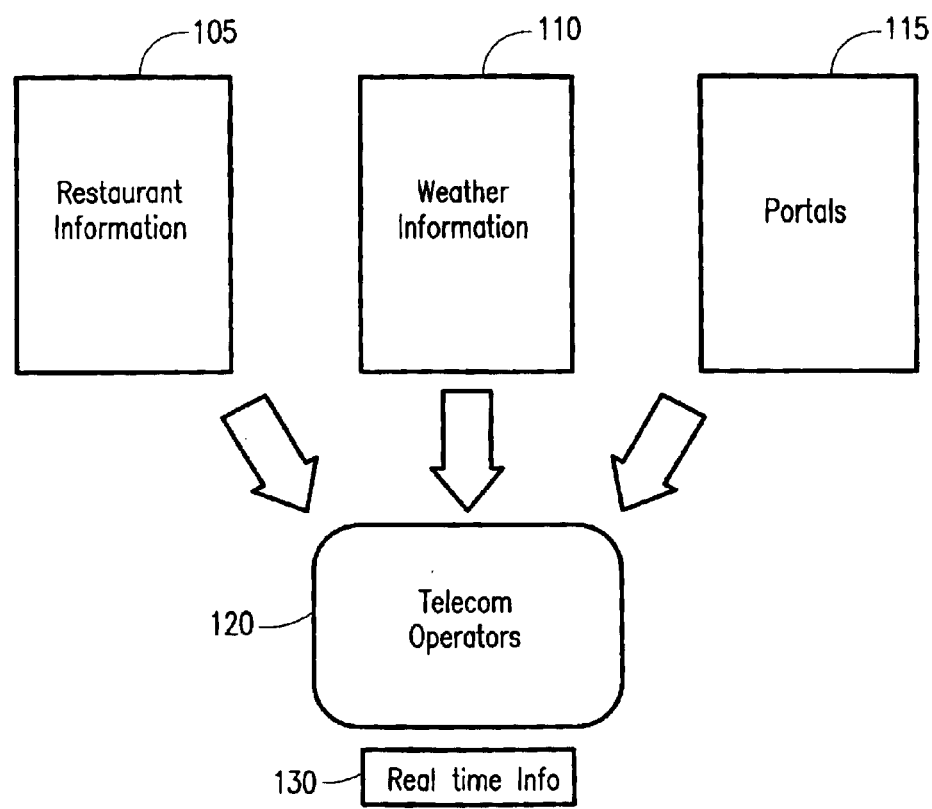
FIG. 1 illustrates a conventional telecommunications system for providing a variety of Internet-based content to a subscriber.

As noted hereinabove, FIG. 1 illustrates a conventional telecommunications system that supplies information to telecom subscribers. In the prior art, the contents of the restaurant and weather information, 105 and 110, for example, are supplied from the content providers to the end users directly. The telecom operators 120, however, in this paradigm are only pipe providers passing the information to the end users, akin to many current ISPs. In particular, and as discussed in more detail hereinbelow, the telecom operators 120 do not share any realtime information 130 about the user with the content providers and are only a means to pass information one-way from the content providers directly to the users who, of course, operate in realtime. As an illustration, in order for a mobile subscriber to retrieve the weather information associated with the subscriber's current location in a conventional system, although the serving mobile telecommunication network already knows the approximate location of the mobile subscriber, since the serving mobile telecommunications network merely act as a conduit for communicating such information, the mobile subscriber nevertheless has to manually provide the location information to the Internet content provider.

Figure 2:
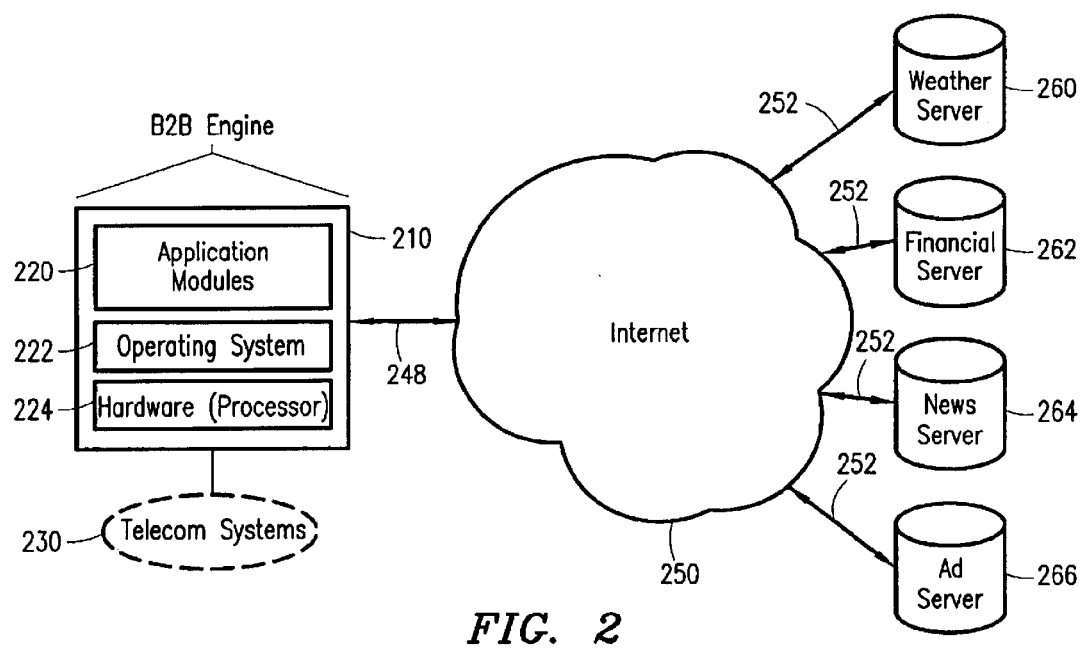
FIG. 2 illustrates a telecommunications system in accordance with the principles of the present invention, providing a business-to-business engine interfacing with external content providers and providing realtime subscriber information thereto.

With reference now to FIG. 2, there is illustrated a business-to-business (B2B) engine 210 in accordance with a preferred embodiment of the present invention. The business-to-business engine 210 includes a number of application modules 220 therein, as more fully illustrated and described hereinbelow with reference to FIGS. 6 and 7 and the accompanying text. In a preferred configuration, the B2B engine 210 runs on network hardware, generally designated in FIG. 2 by the reference numeral 224, e.g., a Sparc processor, and uses an operating system/middle ware 222, e.g., Solaris OS, which is stable and performs various functions described in more detail hereinbelow. It should, of course, be understood that alternate hardware and software may be utilized in the implementation of the instant invention, as understood by one skilled in the art. With further reference to FIG. 2, the B2B engine 210 is connected to a telecommunication system 230 and to the Internet 250.

The telecommunication system 230 preferably includes a wireless service provider or any service provider that services a number of subscriber or user terminals, e.g., cellular phones, personal data assistants (PDAs) or any wireless or wireline communications device or equipment capable of receiving signals. In addition, the B2B engine 210 is coupled, via a link 248 to the Internet, generally designated by the reference numeral 250, which includes content provider applications that supply information to users proactively. The supplied information may be found at and forwarded from a weather server 260, a financial server 262, a news server 264 and/or an ad server 266, via a respective link 252 to the Internet 250, which provides the gateway for the respective services.

An Internet portal for collecting and providing certain services based on such collected information may also be connected to the Internet 250. Such a portal may further communicate with other associated servers 260, 262, 264, 266, and communicate such collected information to a requester via the Internet 250.

Figure 3:
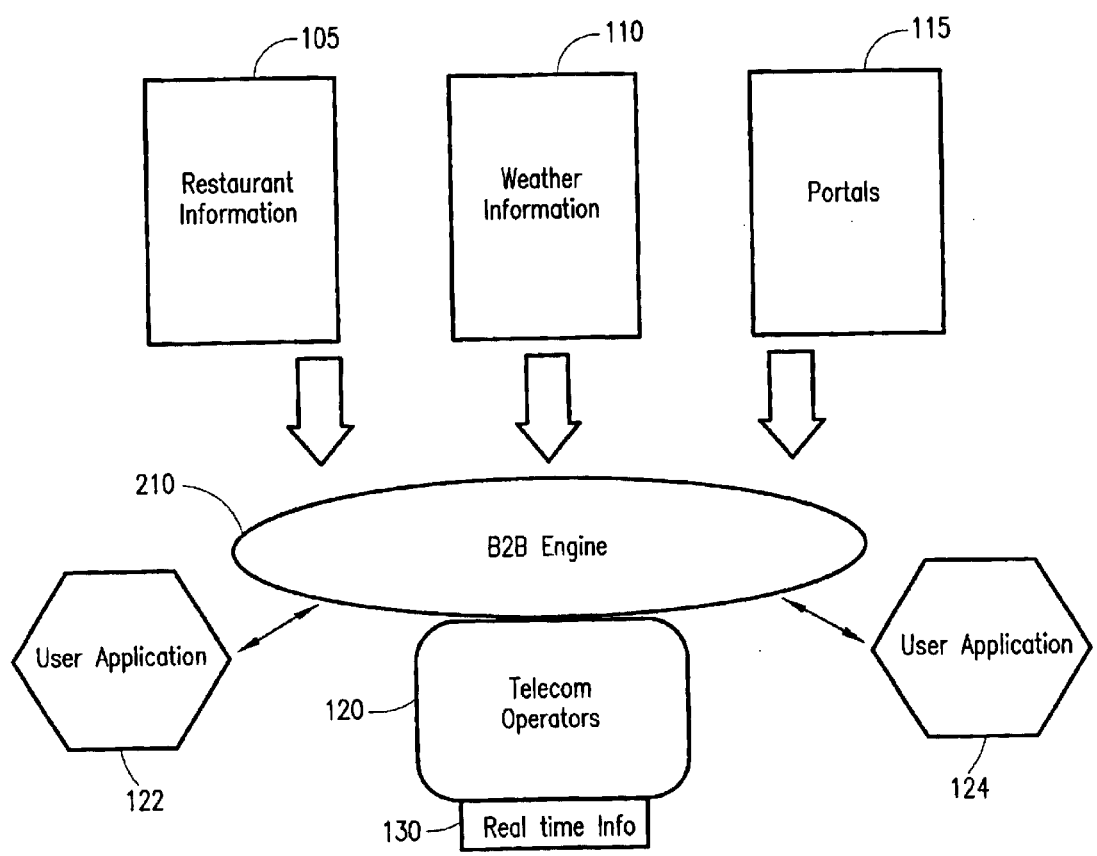
FIG. 3 further illustrates the telecommunications system of FIG. 2, demonstrating the interaction between telecommunications operators and the content providers by way of the business-to-business engine in accordance with the present invention.

With reference now to FIG. 3, there is illustrated a preferred embodiment of the present invention, showing the alternate paradigm of the instant invention as compared to the conventional paradigm shown in FIG. 1. The B2B Engine 210 connected to a serving telecommunication operator 120 communicates certain realtime information associated with a particular mobile subscriber to any one of the content providers, such as restaurant information provider 105, weather information provider 110 or service portal 115. Each of these content providers or portal can then use the received realtime information associated with a particular mobile subscriber to provide a service customized to that particular subscriber's realtime status or preference. As an illustration, a request for nearby Italian restaurants will be answered and provided to the requesting mobile subscriber without the mobile subscriber manually typing in the current location thereof. The B2B engine would automatically receive the current location of the requesting mobile subscriber and communicate this realtime information (location information) to the content provider proactively.

Figure 8:
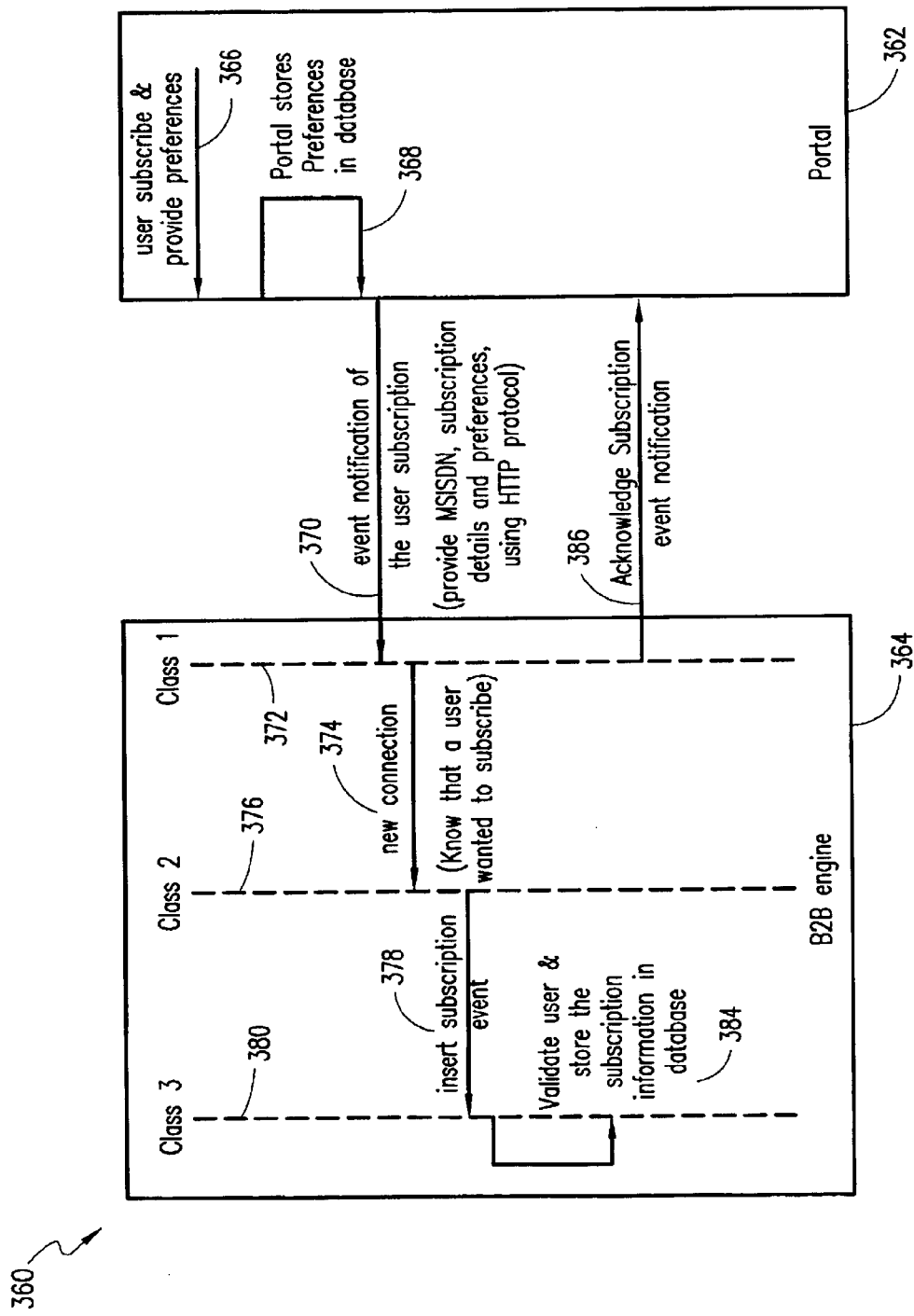
FIG. 8 is a flow diagram illustrating a flow of signals employed in user subscription initialization.

As further described in FIG. 8, in order for a particular content provider to receive certain realtime information or event associated with a particular mobile subscriber, the content provider must subscribe with the B2B Engine. The content provider may need to provide a mobile identification number associated with a particular mobile subscriber and subscribe with the B2B engine to monitor and provide the content provider with certain realtime information associated with that particular mobile subscriber. As an example, the weather information provider may subscribe with the B2B engine to monitor a particular subscriber's location and "on" information. As a result, whenever that particular mobile subscriber turns his mobile station on, such realtime information will be provided to the weather information provider by the B2B engine. The weather information provider will, in turn, automatically provide the current weather information associated with that particular location to the mobile subscriber. The mobile subscriber need not manually request weather information nor does the user have to manually enter his current location. The act of turning his phone "on" will automatically trigger those predefined services to be generated. As further illustration, upon the arrival of a user in a city, weather information of this city, headline news concerning this city, traffic situation in that city, etc. is sent to the user. All of this is done automatically without the knowledge of the user, but according to his preference, the network intelligently determines that the user needs this information while in this location. Also, if a traveling user passes by a crime area or a bad neighborhood, the B2B engine will intelligently know the user's location and inform the portal, which will send information regarding the crime rate or the latest headline news for this current location. This will help people on the move, and in general will help people no matter how often they travel. Moreover, in a preferred embodiment of the present invention, the network as a whole is interconnected and intelligently exchanges information regarding the user status to provide the best service to the end user. The proposed B2B engine provides this interconnectivity and intelligently connects the information providers or portals, to the mobile operators that the user resides on. A non-realtime system, a portal, and a realtime system, a mobile operator interact and operate smoothly despite the differences in their operating nature.

The content provider information, such as restaurant information 105, weather information 110 and portals 115, can channel or pipe the requested information or service through the telecom operator 120 directly, as in FIG. 1, or alternatively, can be sent to the telecom operator 120 through a B2B engine 210, such as engine 210 described in connection with FIG. 2 and further hereinbelow. It should be understood that the B2B engine 210 of the present invention, preferably resides on the telecommunications network and is interposed between the content providers and the telecom operators 120. Accordingly, the B2B engine 210 is responsible for getting the aforementioned realtime information 130 associated with the respective user, e.g., location and/or preferences, and processing this information. The B2B engine 210, upon receipt of the realtime status information, forwards the realtime data to the content providers, thereby permitting customization according to the respective user's realtime situation and preferences.

Figure 4:
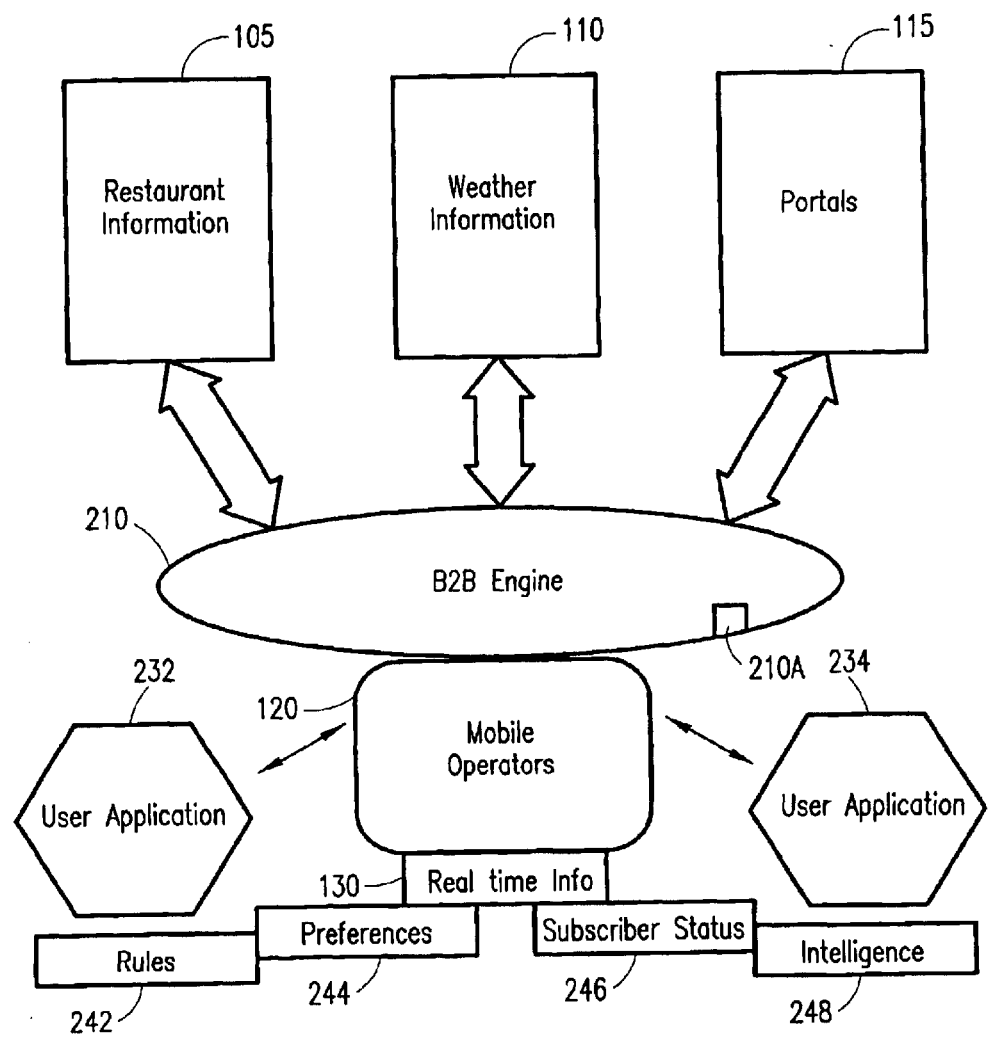
FIG. 4 illustrates a preferred embodiment of the present invention illustrated in FIGS. 2 and 3, demonstrating the interaction between mobile telecommunications operators and content providers using the business-to-business engine.

With reference now to FIG. 4 of the Drawings, there is illustrated another preferred embodiment of the present invention where the telecom operators 120 are mobile operators, e.g., in accordance with the Global Subscriber Mobile (GSM) system, Personal Communication System (PCS) or other mobile telecommunication standard. The B2B engine 210 resident within the mobile network maintains the realtime information exchange between the mobile operators 120 and the respective content providers, e.g., the aforedescribed restaurant information 105, weather information 110 and portals 115. The B2B engine 210 determines realtime information about the mobile subscribers in communication with the mobile operators' network, by communicating with the network and the respective users to determine a variety of subscriber information: subscriber rules 242 for application and any requisite conditions, subscriber preferences 244, subscriber status 246, and any intelligence factor 248 necessary to satisfy the needs of the mobile subscriber. This subscriber information is gathered for each user and supplied to the content providers, which provide the information to the mobile subscriber. The restaurant information 105, weather information 110 and portals 115 are customized according to the realtime status of the user, and provided from the B2B engine 210 to the content providers in realtime, by the B2B engine 210 regarding the realtime status, requirements, preferences, rules and/or location of the subscribed user.

A preferred embodiment of the present invention integrates a realtime system, e.g., the aforementioned telecom operator 120, and a non-realtime system, e.g., content providers, using the business-to-business (B2B) engine 210 of the present invention. The B2B engine 210, as described herein, communicates with the respective telecom operators 120 and the associated network elements to get realtime information about their subscribers, processes the subscriber information and supplies the information to the content providers in accordance with the certain subscribed events previously requested by those content providers.

In another preferred embodiment of the present invention, there are a plurality of telecommunication operators 120, each having discrete subscribers associated therewith. Each telecom operator 120 in this embodiment preferably acts independently and supplies realtime information about the respective subscribers to the content providers. In a preferred embodiment of the present invention, each telecom operator 120 is issued a unique identification number. The respective content provider(s), according to the request made by an identifiable telecom operator 120, then sends the requested information to the user subscribed in that telecom operator 120 network.

Figure 5:
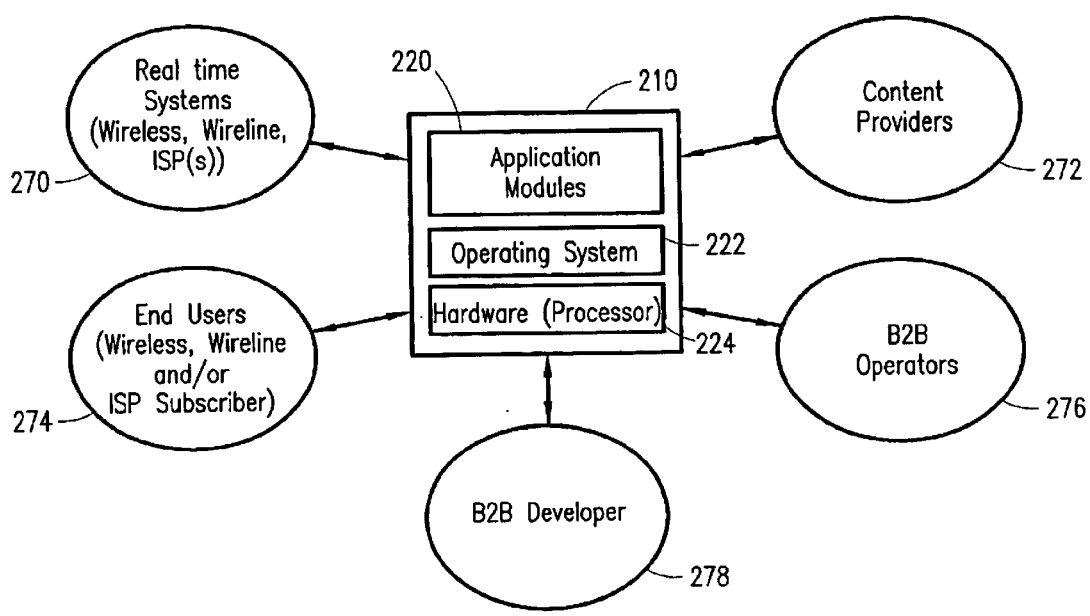
FIG. 5 illustrates exemplary interactions between the business-to-business engine of the present invention and different elements of a network.

With reference now to FIG. 5, there are illustrated exemplary interactions between the business-to-business (B2B) engine 210 of the present invention and different elements of the network. Realtime systems 270, such as wireless communication systems, wire line communication systems and ISPs, interface with the B2B engine 210 to provide realtime information about subscribers and end users to the B2B engine 210. Content providers 272 are coupled to the B2B engine 210 to get realtime information from the B2B engine 210 and the behavior information of subscribers.

The content providers 272 also provide information to an end user, e.g., a wireless communication subscriber, a wire line subscriber or an ISP subscriber and designated generally by reference numeral 274, through the B2B engine 210.

With further reference to FIG. 5, rather than communicating these monitored realtime events to external content providers, application modules and services associated with the B2B engine can independently generate and provide certain desired services to those monitored mobile subscribers. Accordingly, a number of B2B developers 278 develop and update application modules in the B2B engine 210 to support new services and/or enhance existing services.

In an alternative embodiment of the present invention the B2B engine 210 is connected to a portal or content aggregators to provide information to the end user. The portals and the content aggregators gather the information from different content providers and supply the gathered information to the end user through different means that will be discussed in more detail hereinafter.

In particular, the user first subscribes to the portal or the content aggregators. Upon the user's subscription, the portals pass the subscription, as an event, to the B2B engine 210. The B2B engine 210 receives the subscription event of the user and stores it in the B2B engine memory 210A or database. It should be understood that the database is preferably an internal database inside the B2B engine 210 or an external database that could be accessed by the B2B engine 210.

It should, of course, be understood to one of ordinary skill in the art that inclusion of a B2B engine 210 into a telecommunications network having various protocols of operation will entail creation of a variety of databases, interfaces and portals necessary to facilitate the flow and interexchange of information. For example, a user's preferences may be stored in a preferences database and trigger conditions or events (rules) operate to initiate a communication. Mobile users of the Internet will expect somewhat equivalent access to that of a fixed station, as well as enhanced, personalized services based upon mobility.

As discussed, for mobile operators, there is the opportunity to become more than a mere pipe provider by exploiting the relationship with the subscribers (monthly bills, personal information) and take advantage of the wireless Internet to generate new revenue. Content providers, in turn, face various challenges to make their content available and personal to mobile Internet subscribers. Indeed, the personalization of Internet services by telecommunications operators coincides with the trend of providing increasingly personalized services on the Internet, particularly, with the advent of vertical portals and personalized user profiles.

As described above in connection with FIGS. 2–5 and set forth in more detail hereinbelow, the system and methodology of the present invention is an intelligent engine that leverages subscriber activity, preferences, location, usage and behavior patterns inherent within a mobile network to provide personalized customizable mobile Internet services in realtime. In particular, the present invention allows content providers to build personalized content based upon mobility in the mobile network, allows mobile subscribers to receive personalized content based upon mobility and allows mobile operators to leverage the mobility information in the mobile telecom network to move up the value chain. Furthermore, the present invention provides a platform for service providers to build new Internet services based upon the realtime information associated with mobile subscribers within a mobile telecommunications network.

As further discussed below in connection with the portals and interfaces of the present invention, a variety of new functions are provided in creating the realtime mobile Internet environment. In particular, a personal preferences user interface and database provide a mechanism for both selecting personal preferences and storing those preferences of an Internet subscriber in a database managed by the telecommunications operator. The requisite realtime mobility information is provided via interfaces with network nodes and/or network elements in the telecommunications system. A rules-based environment allows wireless Internet subscribers to customize or develop new services based upon realtime events. Exemplary rules-based customizable services include:

Upon mobile powering up,
access information from finance.yahoo.com
deliver via short message service to mobile In this example, the wireless Internet subscriber uses the powering up of their own mobile as a realtime event to invoke a service, and customizes that service to deliver news from a particular website in a particular format. Another exemplary service includes:

Upon detection of arrival in new town,
reroute calls to new number
deliver request for hotel room and car rental to travel coordinator
await receipt of confirmation
acknowledge confirmation
alert to user In this example, the wireless Internet subscriber uses the time of arrival, e.g., via plane, to initiate a variety of actions to facilitate coordination of travel needs. If time zone changes occur, an alert may be generated confirming the subscriber of the time change.

As further described above, all those desired events are subscribed with the B2B Engine by content providers. The B2B Engine thereafter communicates with the serving mobile telecommunications network and determines that a particular event has occurred for a mobile subscriber and communicates such triggering event with the subscribed content provider to enable the content provider to automatically effectuate all those services.

Figure 6:
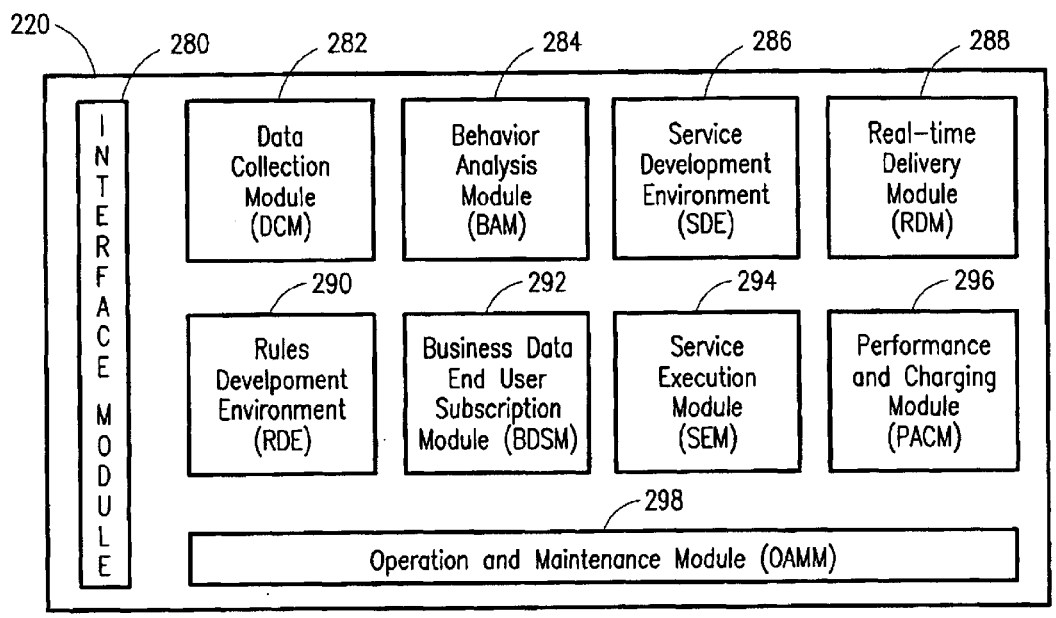
FIG. 6 illustrates an architecture of a number of application modules in a preferred embodiment of the present invention.

The numerous features of a Business-to-Business (B2B) engine is discussed hereabove. To achieve the functionalities mentioned and to allow for its interconnection with the network, certain features and components should be available in the B2B engine. With reference now to FIG. 6, there are illustrated a variety of business-to-business (B2B) engine 210 application modules 220 in a preferred embodiment of the present invention. As shown, the B2B engine application module 220 includes a variety of discrete modules, each having an important role in the system. In particular, the B2B application modules 220 include an Interface module (IM) 280, a Data Collection Module (DCM) 282, a Behavior Analysis Module (BAM) 284, a Service Development Environment (SDE) 286, a Realtime Delivery Module (RDM) 288, a Rules Development Environment (RDE) 290, a Business Data/End User Subscription Module (BDSM) 292, a Service Execution Module (SEM) 294, a Performance and Charging Module (PACM) 296 and an Operation and Maintenance Module (OAMM) 298.

The aforementioned Interface Module (IM) 280 is responsible for interfacing the application modules 282–296 with the content providers and the telecommunication systems. The IM 280 interfaces with several external components, such as different telecommunication systems and ISPs. The IM 280 also provides an interface with the content providers. One of the primary functions of the IM 280 is to link external components in the network to the application modules in the B2B engine 210. In a preferred embodiment, the IM 280 internally interfaces with the Data Collection Module (DCM) 282 and the Realtime Delivery Module (RDM) 288. It should, of course, be understood that the IM 280 also could be interfaced with other internal modules, as well as external components of the network, depending on the system requirements.

With further reference to FIG. 6, the Data Collection module (DCM) 282 is responsible for retrieving and storing realtime data from telecommunication systems and ISPs.

The DCM 282 internally interfaces with the Business Data Subscription Module (BDSM) 292 to find out about data subscriptions from the content providers. The DCM 282 also interfaces with the Behavior Analysis Module (BAM) 284 and with the Realtime Delivery Module (RDM) 288 to deliver realtime information to the content providers.

The Behavior Analysis Module (BAM) 284 is preferably a set of artificial intelligence programs which check the subscription information from the BDSM 292 and perform the analysis on the realtime data. Preferably, the BAM 284 is coupled to the RDM 288 to deliver the results to the content providers. In addition to being interfaced to the BDSM 292 and the RDM 288, the BAM 284 is interfaced to the Data Collection Module (DCM) 282.

The Rules Development Environment (RDE) 290 allows the development of rules used for the development of services. The RDE 290 stores the rules in a Rule Repository (Rrep). The rules could be constantly updated to suite new services being adopted and varied according to the preferences of various components in the system. The Service Development Environment (SDE) 286 allows telecom operators or end users to develop new sets of services based on a set of rules. The SDE 286 is internally interfaced with the Rule Repository to develop services and with the Service Execution Module (SEM) 294. The Service Execution Module (SEM) 294 executes the service used, and is internally interfaced with the SDE 286 and the BDSM 292.

The Business Data/End User Subscription Module (BDSM) 292 allows the content providers to subscribe to realtime and behavioral data, and also allows end users to subscribe to the services. To do that, the BDSM 292 is internally interfaced with the RDM 288. The Performance and Charging Module (PACM) 296 is responsible for collecting statistics, keeping track of the number of times realtime data was requested by the content providers and the number of subscribers accessing their services. The PACM 296 also keeps track of other statistical data that could be helpful to fully utilize the network and its performance. The PACM 296 also produces charging for post processing.

Lastly, the Operation and Maintenance Module (OAMM) 298 is responsible for managing and configuring the B2B engine 210. The OAMM 298 is capable of configuring the content providers, maintaining the B2B engine, handling faults in the system, and managing the security issues in the system, as well as other operational and maintenance functionalities.

It should be understood that the B2B engine application modules 220 illustrated in connection with FIG. 6 and discussed hereinabove are preferably treated as being independent, despite the fact that they could be joined together in one module or at least several could be joined together. The discrete modules preferably have a modular design for the applications, and are preferably Java-based. Alternatively, other programming languages that are suited for the above-mentioned characteristics may be employed, e.g., C++, Java Servlets, Java Beans, JSP, and others. As discussed, an important aspect of the present invention is having near Realtime performance. In addition to coping with realtime environments, the system is designed to reduce fault and has a fault tolerance system.

Figure 7:
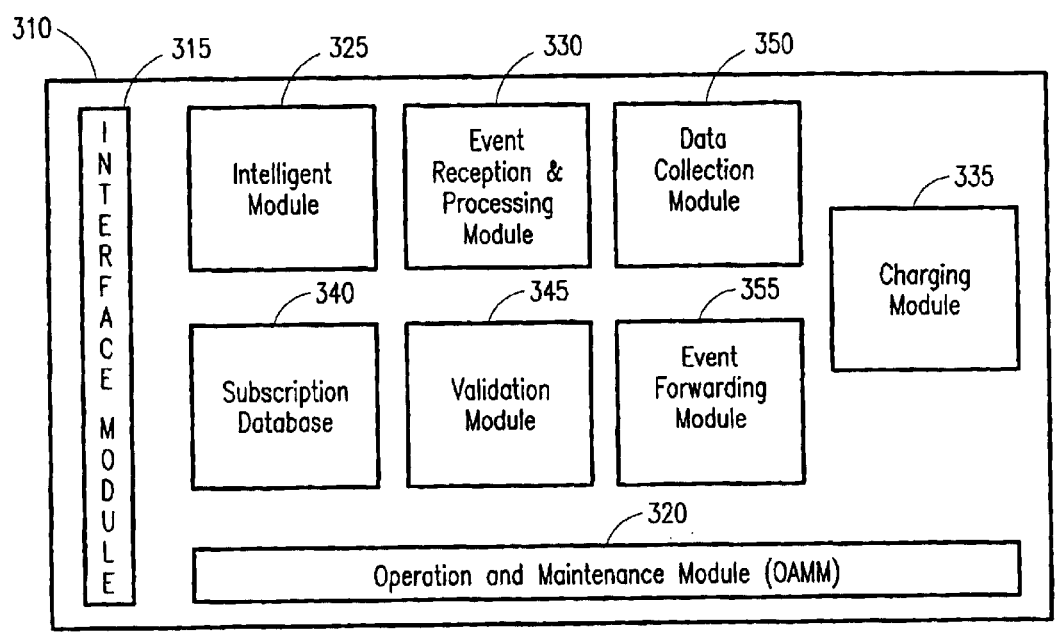
FIG. 7 illustrates an alternate architecture for the application modules from that shown in FIG. 6 in accordance with another embodiment of the present invention.

Another preferred embodiment of the B2B engine, further illustrating the modularity and the implementation using different modular architecture, is shown in FIG. 7. The B2B engine in this embodiment, designated by the reference numeral 310, also includes an interface module 315 and an operation and maintenance module 320 as described above.

However, this embodiment preferably includes an intelligence module (INM) 325, an event reception and processing module (ERPM) 330, a charging module (CM) 335, a subscription database (SD) 340, a validation module (VM) 345, a data collection module (DCM) 350 and an event forwarding module (EFM) 355.

Upon reception of a subscription event from a portal, by the B2B engine Interface Module (IM) 315, the IM 315 interfaces with the Validation Module (VM) 345 to validate this subscription event. The VM 345 interfaces with the data collection module (DCM) 350, which allows the submission of the subscriber identity and allows the storage of the events in a subscription database (SD). The SD must be secure and preferably scalable to allow expansion to the number of subscribers. The DCM 350 also is responsible for informing the portal that the subscribed user has been successfully registered in the B2B engine 310 database. Events received from the network nodes indicating the status of the mobile subscriber, arrive at the Interface Module and processed at the Event Reception and Processing Module (ERPM) 330. These events are validated using the Validation Module (VM) 345, by accessing the subscribed user preference in the SD, which is done to ensure that the user is a registered B2B engine 310 subscriber.

After validating the user profile, the event is packed and a notification is sent to the portal, using the Event Forwarding Module (EFM) 355, via a highly secure HTTP notification message. After this notification has been sent to the portal regarding the subscribed user status, the Charging Module (CM) 335 creates a charging record for the portal concerning the information sent.

The modules, as mentioned above with respect to FIGS. 6 and 7, could be arranged in a variety of configurations to provide the functions needed by the system. However, looking at the B2B engine 210/310 from a different perspective, different architecture for the modules could be implemented.

For more understanding of the interaction of the portal with the B2B engine, reference is now made to FIG. 8, which further illustrates the transmission of a subscription event of a user from a portal. FIG. 8 represents a timing diagram, generally designated by the reference numeral 360, for the subscription event and the interaction of a portal 362 with a B2B engine 364 regarding this subscription. The user first subscribes to the portal service using any of several mechanisms, e.g., through the web site of the portal 362, www.yahoo.com, etc., generally designated by reference numeral 366. The user, however, needs to provide various person and preference information to the portal 362. This information includes the user identification number (MSISDN), mobile operator and various preferences associated with the desired content or events to be monitored. The portal 362 stores 368 all of the supplied user information in a database therein. Upon storing 368 the information, the portal 362 sends an event notification 370 informing the appropriate B2B engine 364 in charge of the mobile operator of the subscribed user. In a preferred embodiment of the present invention, the B2B engine 364 is in charge of a mobile operator or in some cases a plurality of mobile operators. The notification event 370 sent to the B2B engine 364 preferably includes a mobile station identification number (MSISDN) of the user, the subscription details, events, and preferences of the user and other related information. This notification event is preferably sent using a secured HTTP protocol.

The B2B engine 364 receives the event notification 370 and processes the information therein. This internal validation is done in a preferred embodiment using a layered architecture, such as also discussed in connection with FIGS. 6 and 7. With reference again to FIG. 8, upon receipt of the event notification 370, a first layer or class, generally designated by the reference numeral 372, requests establishment of a new connection (step 374). A second layer or class 766 inserts this subscription event (step 378) in a third layer or class 380 which validates the user identification number (MSISDN) (step 382) and stores (step 384) the subscription information in a database. Upon the completion of validation step 384, an acknowledgment is sent (step 386) to the portal 362 regarding the subscription event notification 370, preferably using an HTTP protocol. The B2B engine thereafter monitors the requested realtime information associated with that particular mobile subscriber.

The B2B engine, as described hereinabove, could operate in a number of ways. In one embodiment of the present invention, the B2B engine polls the relevant network nodes to request updated information. In another embodiment, the network nodes are programmed to inform the B2B engine of changes in status of the user. Yet another embodiment allows the mobile station to report status information to the B2B engine, this is done by triggering an application client program in the mobile station. However, these preferred embodiments could function concurrently. As an example, the B2B engine could poll some network nodes while other network nodes are reporting their status to the B2B engine. Also, the mobile station could report its status to the B2B engine and this same status report could be supplied also by a network node. The B2B engine, however, intelligently determines that the information sent is related, redundant, and combines both pieces of information to perform advanced functions based on a better understanding of the user status.

Figure 9:
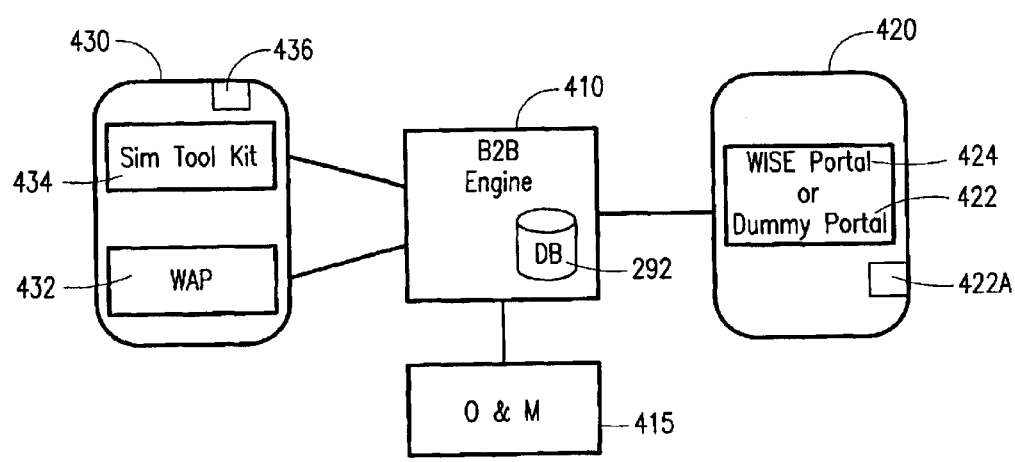
FIG. 9 illustrates a preferred interface between a portal and user equipment through the B2B engine of the present invention.

With the above discussion of the position of the B2B engine within a telecommunications network and various modules in mind, attention should now be directed to FIG. 9, which illustrates exemplary interworkings of a B2B engine 410 in a preferred embodiment of the present invention. As illustrated, the B2B engine 410 is connected to a front-end portal 420, to a mobile station 430 (via wireless connection) and an Operation and Maintenance (O&M) 415 Management system. The O&M system 415 will provide an operator or the owner of the product the capabilities to operate and maintain the B2B engine. All the fault and alarm handling can be controlled and monitored through this O&M system 415. Also, a remote administration system will be accessible, as shown herein or a module inside the B2B engine as described earlier with reference to FIG. 6. As shown in the figure, the mobile station 430 may include a Wireless Application Protocol (WAP) toolkit 432 and/or a Subscriber Identification Module (SIM) development toolkit 434 therein.

The WAP toolkit 432 is used to develop and support WAP applications, which, as is understood in the art, gives a wireless user access to the contents and services of the Internet. The WAP toolkit 432 preferably resides in the mobile station 430, which preferably is able to support the WAP protocols.

The SIM toolkit 434, which resides in the mobile station 430 is used for value-added services and e-commerce using the mobile station, enabling transactions over the Internet. For example, using a SIM toolkit-enabled mobile station, a user may be able to check their bank account, pay bills, and all other services achieved by today's wire line Internet access. The SIM toolkit 434 is preferably programmed into a SIM card, designated generally in FIG. 9 by the reference numeral 436, and additionally enables an interface between the network and the end user. A preferred embodiment of the Mobile Equipment (ME)/Subscriber Interface Module (SIM) interaction with the B2B engine will be described hereinafter with reference to FIGS. 10–13. As noted, the Business-to-Business engine 410 is also connected to the front-end portal 420, or a number of portals, which provide information to the end user. It should be understood to those skilled in the art that this information is tailored according to respective user preferences and is collected from various content providers. It should also be understood that the portal 420 in a preferred embodiment of the present invention could be a dummy portal 422 or one designed to better exploit the Internet connections, e.g., a so-called WISE portal 424, as is understood by one of ordinary skills in the art.

Figure 10:
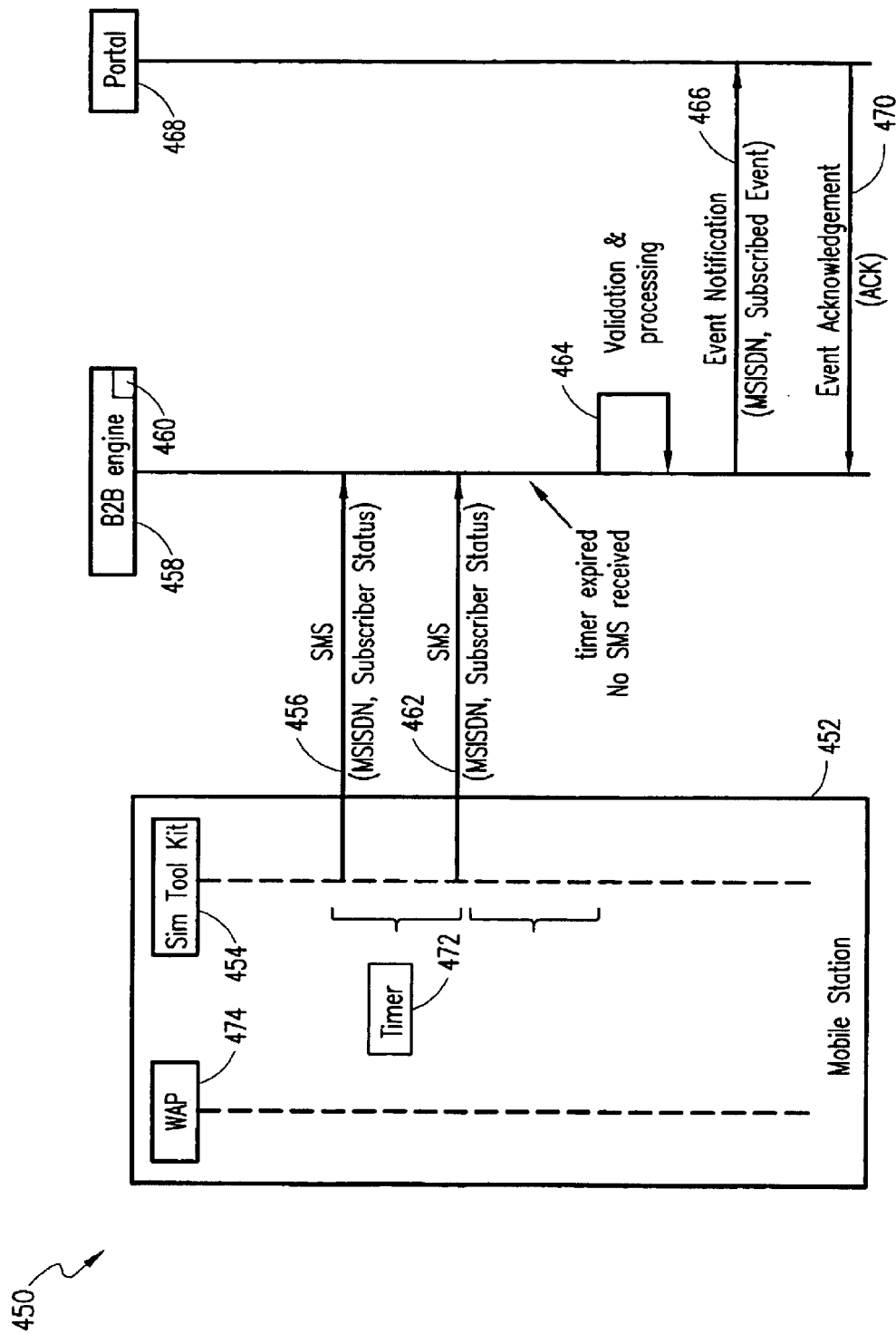
FIG. 10 is a flow diagram illustrating a number of signals employed in initiating an "OFF" trigger pursuant to the teachings of the present invention.

With reference to FIG. 10, there is illustrated an example of an "OFF" Trigger for a wireless phone, the steps of which are generally designated by the reference numeral 450. A Mobile Station (MS), generally designated by the reference numeral 452, includes a Subscriber Identification Module (SIM) toolkit 454 located therein. The SIM toolkit 454 transmits, with a determined intervals, short message service (SMS) messages, generally designated in the figure by the reference numeral 456, containing the subscriber status and the mobile station 452 ISDN number (MSISDN). The SIM toolkit 454 performs this action to keep an associated B2B engine 458 informed of the realtime information and location of the MS 452. Receipt of this message initiates a timer 460 for the B2B engine 458. If the timer 474 does not expire and another message is received before expiration, within the predetermined time interval, the timer is reset. If, however, the timer 472 expires in the B2B engine 458, meaning that the B2B engine 458 did not receive any message from the user in a determined amount of time, the B2B engine 458 will assume that the mobile station 452 has been turned off, e.g., sometime after transmission of SMS message 462 to the B2B engine 458. This, as an example, could be an indication that the user is busy or asleep and that no new contents should be sent by the portal to the subscribed user. After the B2B engine 458 fails to receive a further message after SMS message 462 in the timer period, B2B engine 458 validates and processes 464 this event, and forwards an event notification 466, containing the MSISDN of that user and an indication of the subscribed OFF event, to a portal 468 associated with this event. The portal 468 then acknowledges 470 the reception of the notification.

Figure 11:
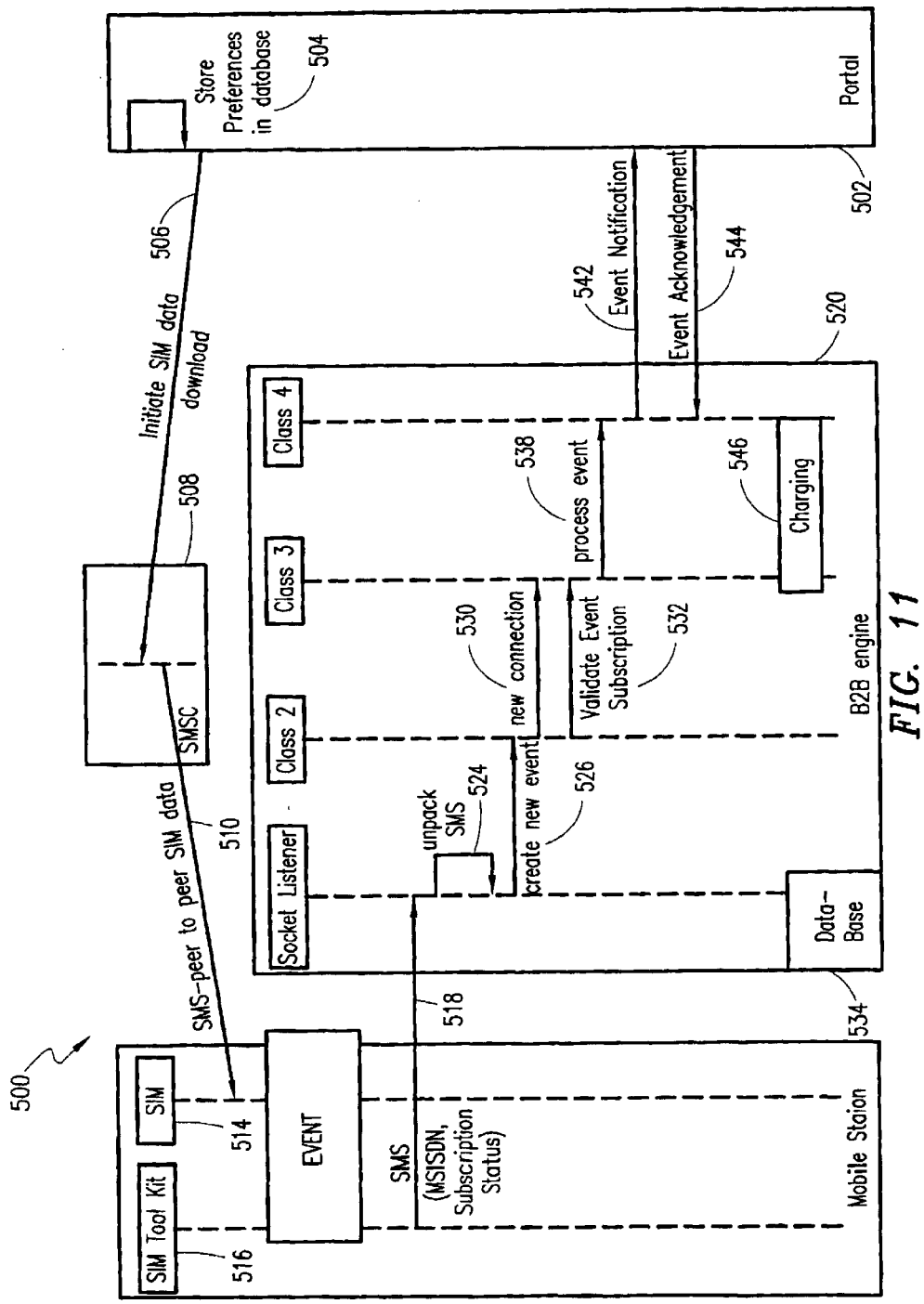
FIG. 11 is another flow diagram illustrating a flow of signals for an event occurring in a telecommunication system in accordance with the teachings of the present invention.

With reference now to FIG. 11, there is illustrated a timing diagram of a usual operation of the system and methodology, in a preferred embodiment of the present invention, the steps of which are generally designated by the reference numeral 500. As with the embodiment described in connection with FIG. 12, a subscribed end user enters information and preferences (step 504) at a portal 502, particularly, into a portal database. After the preferences of the end user are stored 504 in the portal database and, preferably, before an event occurs, a SIM application is initialized for realtime services and over the air activation for a subscribed user, and a plurality of SIM data is downloaded (step 506) from the portal database to a Short Message Switching Center (SMSC) 508, e.g., over an air interface. The SIM data is then sent peer-to-peer (step 510) to Mobile Equipment (ME) 512 that includes a SIM card therein, generally designated by the reference numeral 514.

Once an event occurs regarding any change in the user preferences, location, etc., a SIM toolkit, generally designated by the reference numeral 516, which resides in the mobile equipment 512, sends an SMS message 518 informing a B2B engine 520 of the subscribed user's status and providing the user's MSISDN number. Upon arrival at the B2B engine 520, particularly at a socket listener 522 thereof, the aforementioned SMS message 518 is unpacked (step 524) in the B2B engine 520 by the socket listener 522, which then creates a new event (step 526) based on the information provided in the SMS message 518. A second layer or class, generally designed by the reference numeral 528 in the B2B engine 520, upon receipt of the new event information 526, then establishes a new connection 830 and validates 532 the event subscribed 526 by comparing the user identity and preferences with what is stored in a B2B database, generally designated by the reference numeral 534. Upon receipt of the new connection and validation information, a third layer or class, generally designated in the figure by the reference numeral 536, processes the event (step 538) and optionally stores the modified information in the B2B database 534. The processed event 538 information is forwarded by the third class 536 to a fourth class 540. An event notification message 542 is sent to the portal 502 by the fourth layer 540 in the B2B engine 520, informing the portal 502 that an event was received and providing the portal 802 with the user's MSISDN.

The portal 502, upon receipt of the event notification message 542 then sends an acknowledge message 544 to the B2B engine 520, acknowledging the reception of the event notification 542, preferably using an HTTP protocol. In a preferred embodiment of the present invention, charging 546 occurs for all information provided, and charging 546 for the realtime event information provided to the portal 502 will occur after the acknowledgment message 544. The charging record will be created in the B2B Engine which will log all the relevant information related to the event. As illustrated, information is preferably delivered by the portal 502 to the end user at the ME 512 using an SMS message. It should, of course, be understood that the contents could alternatively be sent using a Wireless Application protocol (WAP), using a WAP over an SMS message or other such protocols.

As discussed above and particularly in connection with FIGS. 12 and 13 the subscribed user employs Mobile Equipment (ME) 512, sometimes referred to as a mobile station, which includes a SIM card 514, on which a SIM application is programmed and running. In a preferred embodiment of the present invention, a B2B engine 520 client application resides on the Subscriber Identification Module (SIM) and is responsible for reporting realtime events occurring within the mobile equipment (ME)/Network entity to the B2B engine 820 server node. The client application uses triggers from the SIM card 514 to invoke a SIM toolkit operation 516 to send Short Messages to the B2B engine server 520 with information on the realtime events happening in the ME-Network. In this embodiment, the short message sent is addressed to the B2B engine and the mobile telecommunication operator acts as conduit to this information sent.

The SIM Application toolkit 516 provides mechanisms which allow applications, existing in the SIM 514, to interact and operate with the Mobile Equipment (ME) 512 download the ME profile to the SIM 514, download data (step 506) to the SIM 514, transfer a user's menu selection to the SIM 514, call control by the SIM 514, MO Short Message control by the SIM 514 and security. The proactive SIM 514 could display text, play a tone, send a short message, set up a call, etc., as is understood in the art.

The interaction between the SIM 514 and the ME 512 is best shown with reference to the following examples described in connection with FIGS. 12 and 13, which illustrate a preferred embodiment of the SIM/mobile entity reporting events to the B2B engine for realtime services. Upon change of the user status or preferences, the B2B engine is updated of such a change by the mobile Equipment (ME). In these figures, the exemplary events that are reported to the B2B engine server are the ON/OFF, Cell Global Identity (CGI) and the location area (LA) change.

Figure 12:
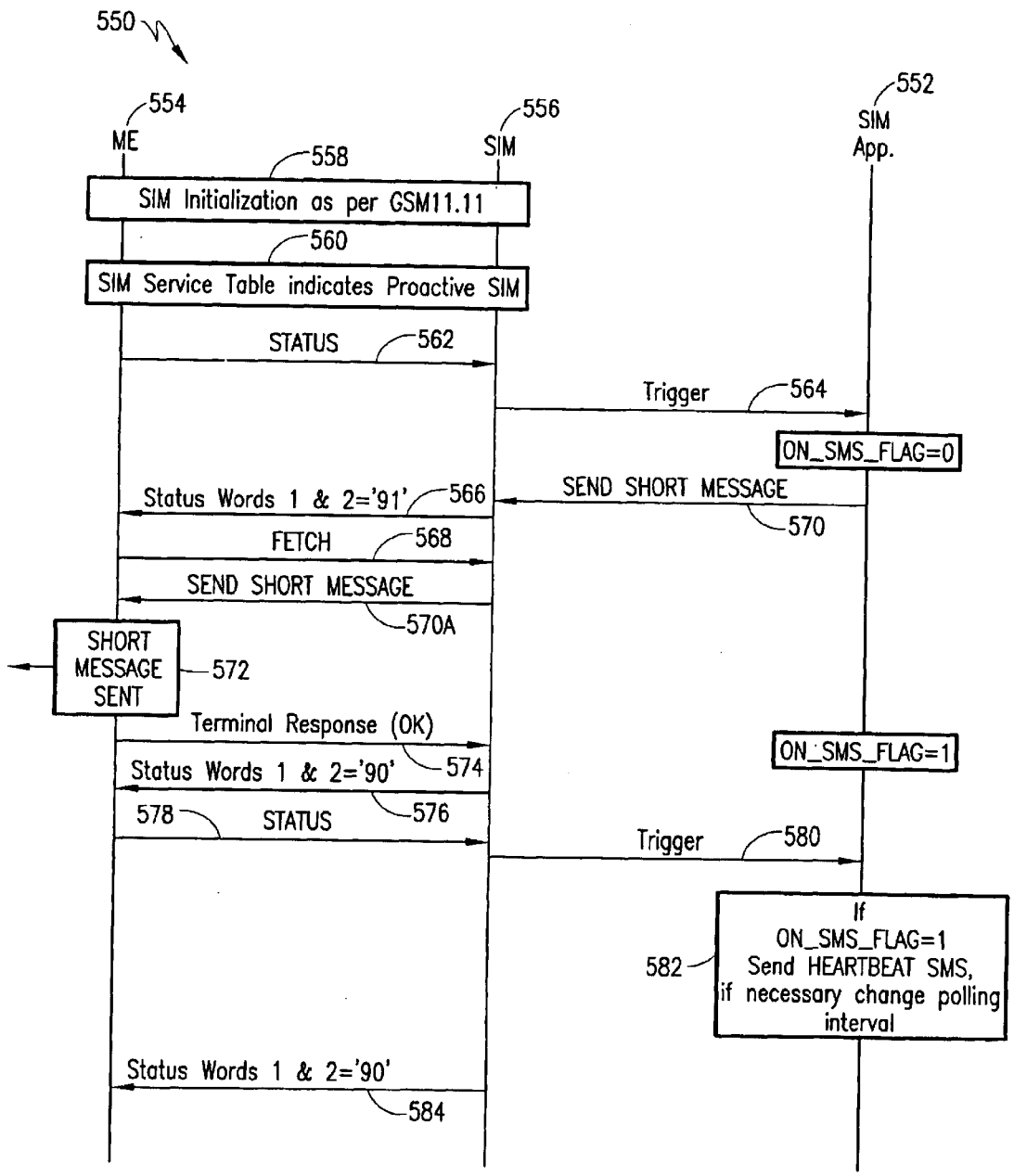
FIG. 12 is a flow diagram illustrating a user-on indication to the B2B engine of the present invention.

With reference now to FIG. 12 there is illustrated, in detail, a timing diagram, generally designated in the figure by the reference numeral 550, of a user "ON" indication to a B2B engine 552. Initially, a given Mobile Equipment (ME) 554 first initializes an associated SIM 556. This initialization (step 558) is done by activating and testing the SIM device 556 to ascertain what functions are supported. At present, this SIM 856 initialization is preferably performed pursuant to a GSM 11.11 standard, although it is understood that alternative initialization protocols may be alternatively used. The identification of a proactive SIM 556 is done at this stage by having the proactive SIM service activated in a SIM service table (step 560). However, if the ME 554 does not support the proactive SIM feature, the proactive SIM 556 shall not send proactive SIM-related commands to the ME, and vice versa. The ME 554 shall then send a STATUS command (step 562) periodically to the proactive SIM 556 during idle mode, as well as during a call, thereby enabling the proactive SIM 556 to respond with a command since the ME 554 always initiates commands to the SIM 556.

After a power-on by the ME 554, the first message sent is the STATUS message (step 564), which is used to trigger (step 564) the appropriate B2B engine 552 client application residing on the SIM card. The client application reads appropriate files on the SIM 556 and packs the relevant information into a short message and requests the SIM to send it onwards to the ME (step 570). The SIM 856 sends a message (step 566) informing the ME 554 that further information is available. The ME 554 then responds using a FETCH command (step 568) to get the information from the SIM 556. The SIM 556, upon receipt of the aforementioned FETCH command 568, sends the composed short message from the client application to the ME 554 (step 570A) in order for the information to be sent to the B2B engine. Following that, the ME 554 sends the short message (step 572) to the B2B engine, informing that the MS 554 has been turned on. The B2B engine 552 receives this message and interprets it further to provide enhanced services. The ME 554 then responds to the SIM 556 informing that the message regarding the event has been sent (step 574). The SIM 556, in turn, acknowledges the response and sends a normal ending message (step 576). The mobile station is now turned on and all the elements, such as the ME 554, the SIM 556 and the client applications 552 are aware of that occurrence. As discussed earlier, the ME 854 sends a periodical status command (step 578) to the SIM 856, which after the ME 554 is turned on, results in a trigger (step 580) to the client application 552 on the SIM card 552, and from which a periodical SMS message (step 578) could be sent.

Figure 13:
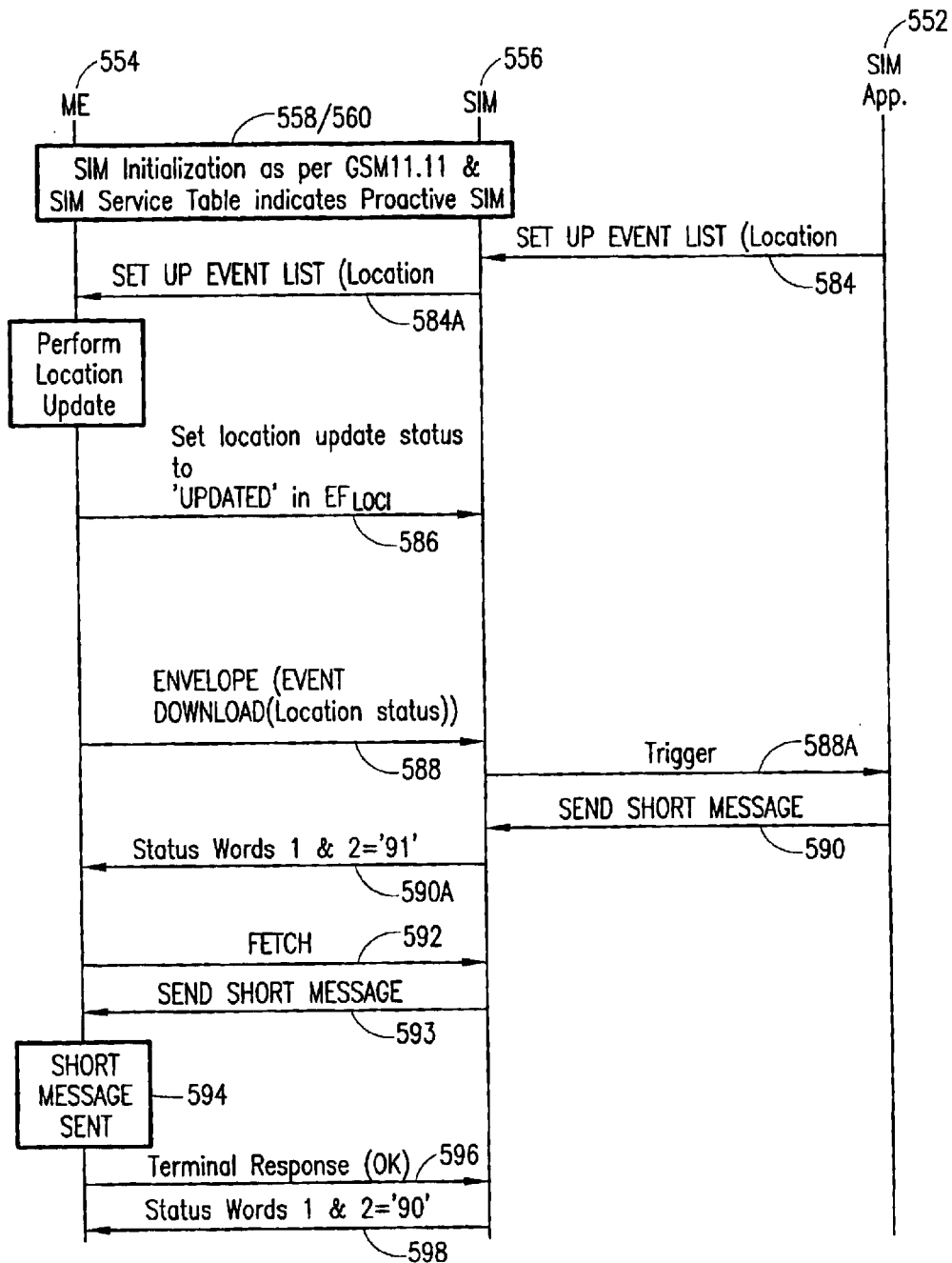
FIG. 13 is a flow diagram illustrating a location area update to the B2B engine of the present invention.

With reference now to FIG. 13, there is illustrated a timing diagram of a location area change indication of the ME 554 to the B2B engine 552, in another presently preferred embodiment of the present invention. As illustrated, SIM 556 initialization and proactive SIM determination (Steps 558 and 560) are first performed, again, preferably, pursuant to a GSM 11.11 protocol. As is understood in the art, the Mobile Equipment 554 is requested by the client application and the SIM to monitor any location change and, upon any such change, the ME 554 informs the B2B engine 552 of this change. The location information as discussed above may be GPS information, cell global identity information, or routing area information associated with a mobile subscriber. Additionally, the Mobile Equipment 554 may also communicate using other packet based protocols, such as USSD messages or WAP.

As discussed, when a change in location happens, appropriate processes in the ME 554 are invoked. The ME forwards a set location update status message (step 586) to the SIM 856, and then informs the client application residing in the SIM, via an envelope command (step 588), that the location area update has occurred. The client application is triggered 588A and takes this data from the envelope command, reads and adds appropriate data from the SIM 556 and packs a short message. This packed short message is sent (step 590) by the client application to the SIM 556, as indicated in FIG. 13, in step 590A the SIM informs the ME of the request to send a short message. With the FETCH command 592 the ME asks the SIM to provide the data for the short message which it does in 593. The ME transmits the packed short message to the B2B engine (step 594) which uses the data to provide enhanced services. The ME 554 then as usual informs the SIM 556 that the short message has been sent (step 596) and the SIM 556 returns a normal ending message (step 598).

The updated information is sent to the B2B engine by the mobile station to update its status and preferences in the B2B engine, as described hereinabove. However, in another preferred embodiment of the present invention, the network nodes self monitor any desired subscriber events update and automatically provide the data to the B2B engine on a realtime basis.

Figure 14:
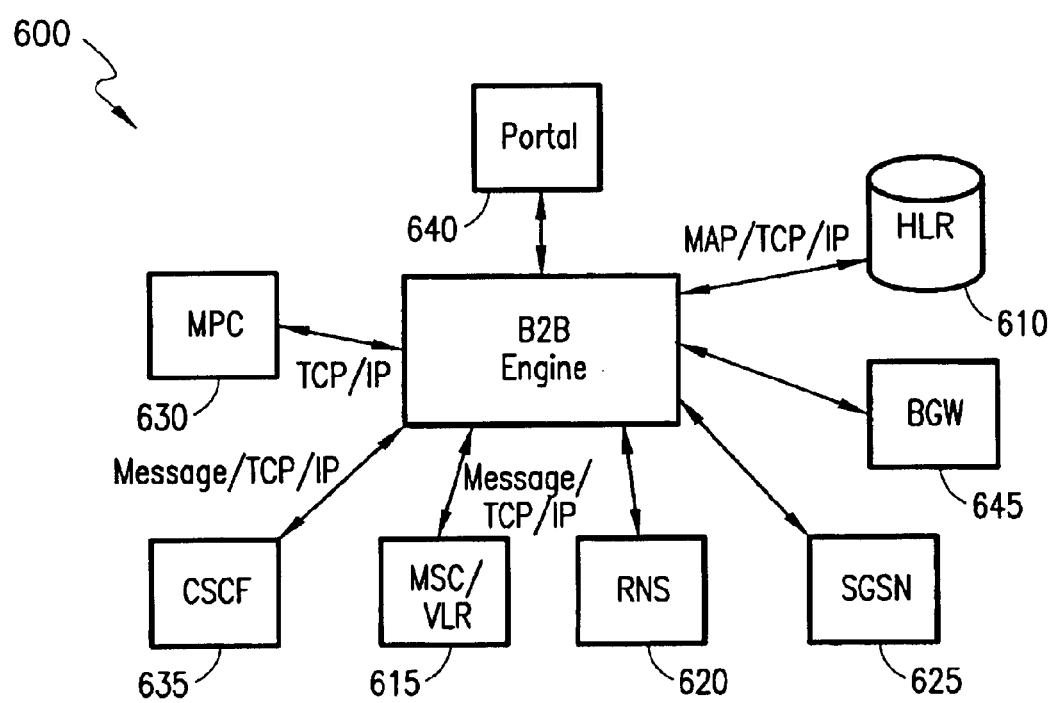
FIG. 14 illustrates an architecture in a preferred embodiment of the present invention, demonstrating a number of interactions between the B2B engine and several network nodes.

With reference now to FIG. 14, the B2B engine 210, in addition to being connected to a portal 640 or to content aggregators, e.g., using a Transmission Control Protocol/Internet Protocol (TCP/IP) or other packet based communications protocol, is also connected to various other nodes in the network, generally designated in FIG. 14 by the reference numeral 600. It should be understood, as described with reference to a preferred embodiment of the present invention, that these nodes could be adapted to gather realtime information about the subscribed user. This could be achieved by programming the network nodes so that they could monitor realtime subscriber events and activities and provide realtime information to the B2B engine regarding the subscriber events received. The network elements can monitor and forward all subscriber events and activities for all subscribers that are being served within that network area, or alternatively, the network elements can monitor and forward subscriber events and activities for those subscribers that have subscribed with the B2B engine. The B2B engine 210 interfaces with network nodes in the network 600 to receive information about the subscribed events from these nodes. The Mobile Switching Center (MSC)/Visitor Location Register (VLR) 615 sends mobility information, VLR record and the call control of related events to a subscriber, e.g., using Message TCP/IP or like protocols. The sending of the realtime information is triggered upon receiving a location update or registration signal from the subscribed user.

Also, handover triggers and radio-related trigger events from a Radio Network Subsystem (RNS) 620 for system 600 is sent to the B2B engine. As is understood to one skilled in the art, a Serving Generalized Packet Radio System (GPRS) Service Node (SGSN) 625 provides mobility and call control-related information to the B2B engine 210, e.g., as related to packet domain networks, such as a generalized packet radio system (GPRS).

A Mobile Positioning Center (MPC) 630 provides the B2B engine 210 with information about the location of the mobile subscriber within the telecommunications network. It should be understood to one skilled in the art that the MPC 630 could be provided by a global positioning service (GPS) or any other means for locating a mobile subscriber station using, for example, TCP/IP protocols to forward the positioning information. A central service control function (CSCF) 635 unit provides to the B2B engine 210 a translation of the address number of the subscriber to an Internet protocol (IP) address and also could provide control related events/information using, for example, Message and TCP/IP protocols.

As also understood by one skilled in the telecommunications art, upon switching on a mobile station (MS), the serving MSC/VLR (Mobile Switching Center/Visitor Location Register) registers the MS and authorize the MS by communicating with the Home Location Register (HLR) associated with that MS. The HLR then informs the B2B engine, upon this registration and authorization, to forward the preferred information to the mobile station, as shown in a preferred embodiment described hereinafter.

The network nodes are intelligently programmed to recognize any information related to the subscribed user and upon the triggering of an event, sends the realtime information to the B2B engine informing it of the update to the end user status. This information is stored in the B2B engine database. The B2B engine 210 processes the information/events sent by the nodes and forwards this formatted information to the portal 640. Upon providing the information/events to the portal 340 by the B2B engine 210, the portal 640 is billed for this realtime information, for example, by a Billing Gateway (BGW) 645. The BGW 645 provides information about when and how much to bill the portals for the realtime information provided. This is done by logging relevant information into charging records for each user requested action. The billing could be done internally in the B2B engine using a charging module, as shown in FIG. 7, or could be an external application connected to the B2B engine such as a BGW, as shown in FIG. 14. Also, the BGW could be in charge of the billing in the mobile operator for each user or provide information, for example, on the remaining balance for subscribers accessing the network or the balance of the subscribers usage. The BGW functionalities are numerous and flexible depending on the services and plan for each subscribed user.

In the preferred embodiment described hereinabove, the network nodes preferably contain a client application (CL)/monitoring agent (MA) programmed in each of the network nodes wishing to report events to the B2B engine. These network nodes monitor certain triggers related to the user and reports them to the B2B engine. Loading of a client application program in certain network nodes such as the HLR and/or the MSC/VLR could be used to monitor certain enabled triggers related to subscriber's behavior, status, mobility parameters, etc. An example of the network nodes providing the information to the B2B engine upon any change to a user status or preferences is provided hereinbelow. Upon any update to the user status or any change regarding the user in a database, the HLR client application is triggered and sends an update to the B2B engine informing the engine of such a change. This client application in the HLR is adapted to recognize any change and automatically report this change to the B2B engine. All network nodes are also programmed to recognize any event and notify the B2B engine of this event, using the triggering mechanism of the client application. The MSC/VLR, for instance, tracks the mobility of the user and upon a detected change, for example the user location is changed, the MSC/VLR client application is triggered and informs the B2B engine of this change. Moreover, the MSC could work together with the MPC to pin-point the user location and send the information to the B2B engine. Also, the MSC/VLR client application is programmed to interact with the RNS to inform the B2B engine of any handover or radio triggers occurring related to the user. The RNS also contains a client application as in all involved network nodes in the update process.

Figure 15:
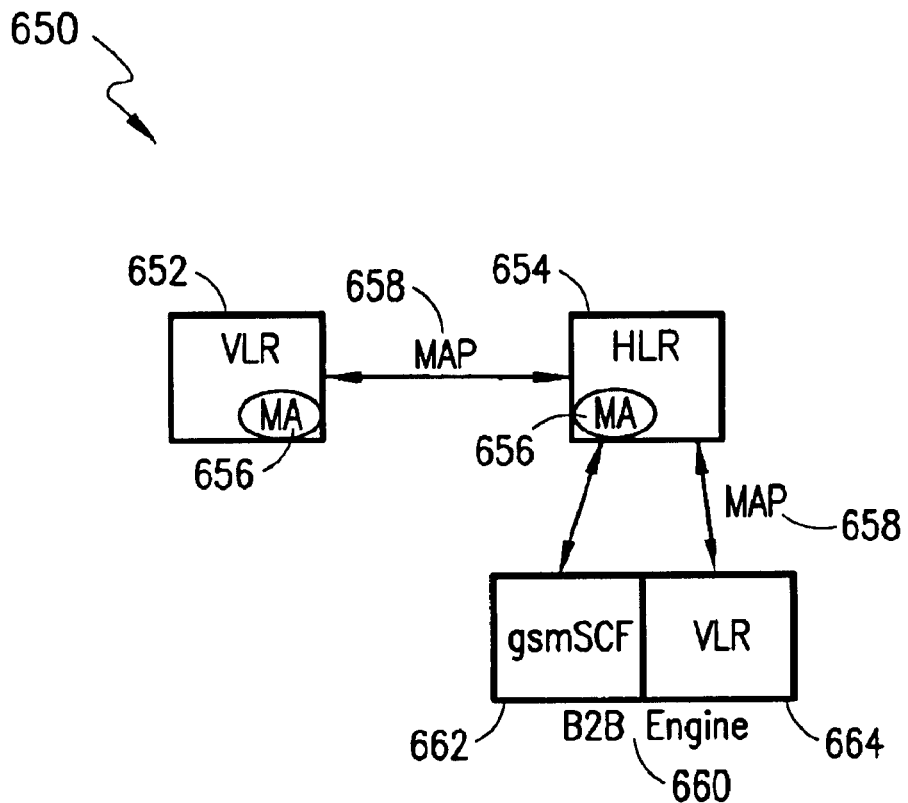
FIG. 15 illustrates an example of network node notification to the B2B engine.

FIG. 15 illustrates another example of the notification, by the network node, of any change in the subscriber status and location. The VLR 652, upon any change to the subscriber status and location, will inform the HLR 654 using standard existing protocols, e.g. MAP 658, of such a change. The determination of the status change is performed using a Monitoring Agent (MA) 656 inside both the VLR 652 and the HLR 654. The HLR 654 in turn will interact with the B2B engine 660, which in this situation is acting as a VLR 664. The B2B engine 660, in this case, being a GSM Service Control Function (gsmSCF) 662 node gets the subscriber status and location information from the HLR 654 and stores it in a database. The B2B engine then performs the necessary operations on this information and acts accordingly. In general, once the client application catches a trigger event in the network nodes (i.e. HLR, MSC/VLR, etc.) representing any change to the subscriber status, the client application in the network nodes informs the B2B engine.

With further reference to FIG. 14, the B2B engine 210, as described hereinabove could receive information/events regarding the subscribed user from the network nodes without requesting this information. However, in another preferred embodiment of the present invention and further referring to FIG. 14, these network nodes are requested to gather realtime information about the subscribed user. When the subscription event is stored in the B2B engine 210 database, a Home Location Register (HLR) 610 is polled to determine the registration information of the mobile subscriber, e.g., using Mobile Application Part (MAP), TCP/IP or like protocols.

The B2B engine 210 interfaces with communication nodes in the network 600 to request information about the subscribed events from these nodes. The B2B engine 210 polls a Mobile Switching Center (MSC)/Visitor Location Register (VLR) 615 to request the mobility information, VLR record and the call control of related events to a subscriber, e.g., using Message TCP/IP or like protocols.

The B2B engine 210 requests handover trigger and radio-related trigger events from a Radio Network Subsystem (RNS) 320 for system 600. A Mobile Positioning Center (MPC) 330 could be polled to provide the B2B engine 210 with information about the location of the mobile subscriber within the telecommunications network. It should be understood to one skilled in the art that the MPC 630 could be any other means for locating a mobile subscriber station, as described hereinabove. A central service control function (CSCF) 635 unit could be also polled to provide to the B2B engine 210 a translation of the address number of the subscriber to an Internet protocol (IP) address, and also could provide control related events/information using, for example, Message and TCP/IP protocols.

The B2B engine 210 provides intelligence in knowing which of the aforementioned elements or nodes to poll to gather the necessary information for provision to a portal 640 using, for example, TCP/IP protocols. The information may be selectively requested according to the needs of the B2B engine in determining the status of a telecommunications device. The B2B engine 210 processes the information/events sent by the nodes and sends the gathered information to the portal 640. Upon providing the information/events to the portal 640 by the B2B engine 210, the portal 640 is billed for this realtime information, as described hereinabove with reference to the previous embodiment.

As an example, when the B2B Engine requires certain information such as subscriber's status from the HLR, a message is sent to the HLR requesting the information. The HLR will inturn respond with the response message informing the B2B engine of the current subscriber status. This same requesting mechanism could be used with the other network nodes. A message could be sent by the B2B engine to any network node requesting information about the subscriber. Upon reception of such a message the network node gets the information and sends it to the B2B engine. The B2B engine could act as a GSM Service Control Function (gsmSCF) node and interrogates the HLR at regular or periodic intervals to get the status and the location information of a subscriber.

Figure 16:
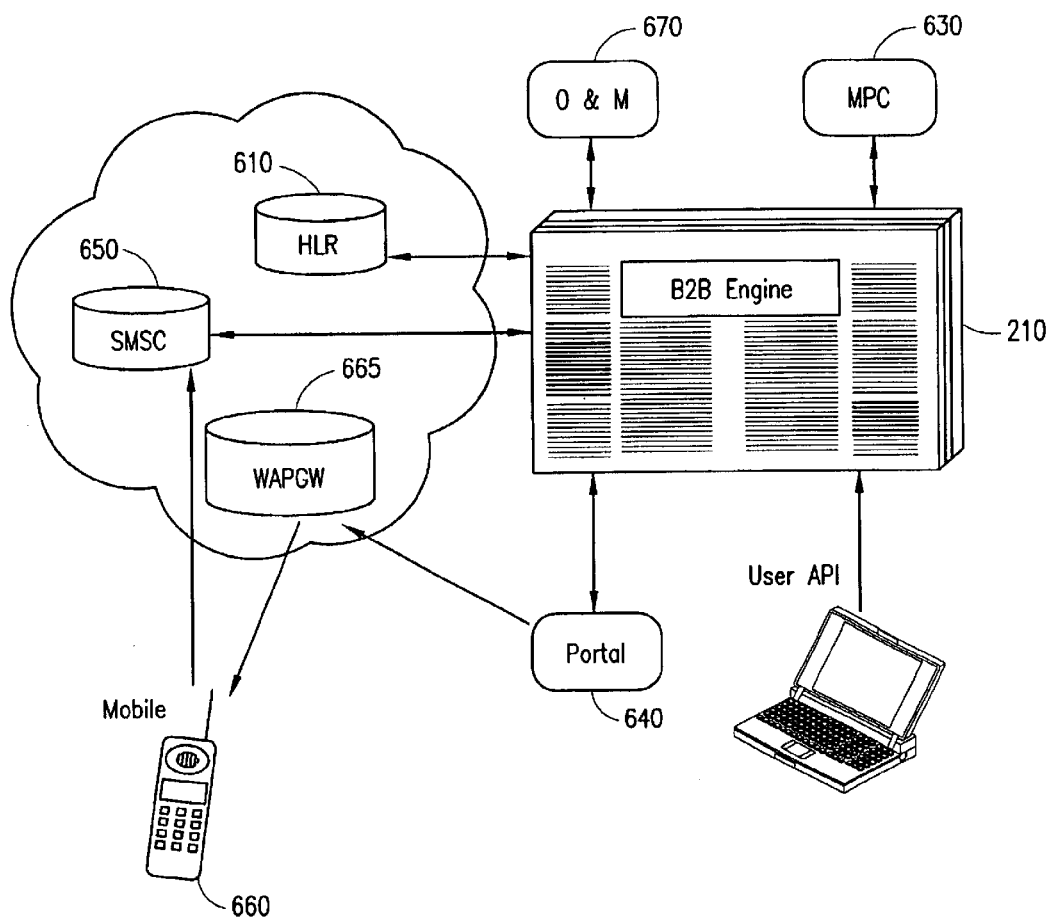
FIG. 16 illustrates the communications of realtime information associated with mobile subscriber from various network elements to the B2B engine in accordance with the teachings of the present invention.

The network environment, within which the B2B engine 210 operates, is fully described hereinabove. In general, there are numerous implementations of the service provided by the business-to-business engine. With reference now to FIG. 16, however, there is illustrated an alternative operation of the B2B engine 210 of the present invention. In this alternate configuration, the B2B engine 210 receives realtime events from a mobile subscriber 660, such as the subscriber status, location area and other events, as described with reference to FIGS. 9–13, using as an example Short Message Service (SMS) messages. The B2B engine 210 gets this information, in addition to other information, by polling different nodes in the network, as described hereinabove with reference to a preferred embodiment. The network nodes however, as described in another preferred embodiment described hereinabove, send the updated status information of the user to the B2B engine whenever any change occurs regarding the subscriber. The B2B engine 210 then parses the events based on the subscribed user preferences and processes the information/event gathered.

These processed events are then sent to the portal/content aggregators/content provider 640, for example, using an HTTP protocol. The portal 640 then personalizes the contents according to the event information provided by the B2B engine 210. The portal converts the contents, for example, to a wireless markup language (WML) used to provide content to narrowband devices, such as mobile stations, PDAs, etc. The WML containing the personalized content is delivered via a wireless application protocol gateway (WAPGW) to the subscribed user via the mobile phone. However, the portal can also deliver the personalized content using an SMS message or any other proprietary wireless data protocol. As is illustrated in FIG. 16, the contents could be sent to the mobile station through a Wireless Application Protocol gateway (WAPGW). The WAPGW is a network node providing direct connection between the mobile network and the dedicated Internet application services, such as the portals. There are numerous methods that could be used for sending the contents to the subscriber. For example, the contents could be sent through the Short Message Service Center (SMSC) using a Short message (SMS) or a WAP sent over an SMS message. Moreover, the contents sent to the mobile station could be an Unstructured Supplementary Service Data (USSD). This could be done using a USSD Gateway that retrieves the information from the portals and sends it to the SMSC for delivery as a short message. Other transport bearers such as GPRS could be used to send content from the portals to the mobile station. Advancements toward fast speed access systems in today's mobile technology lead the way to third generation (3G) wireless systems. The data packet transport systems such as the Generalized Packet Radio Service (GPRS) and the Evolved Data for GSM Evolution (EDGE) provide fast connections that will allow easy and quick content delivery to the mobile stations. Taking these transport bearers in mind, all the communication between the mobile stations, the B2B engine, and the Internet portals could be performed using these transport bearers discussed herein. For example, instead of sending an SMS message by a mobile station through a SMSC, as described hereinabove, a mobile station could communicate with the B2B engine using a GPRS network by sending data packets utilizing the high speed access.

Figure 17:
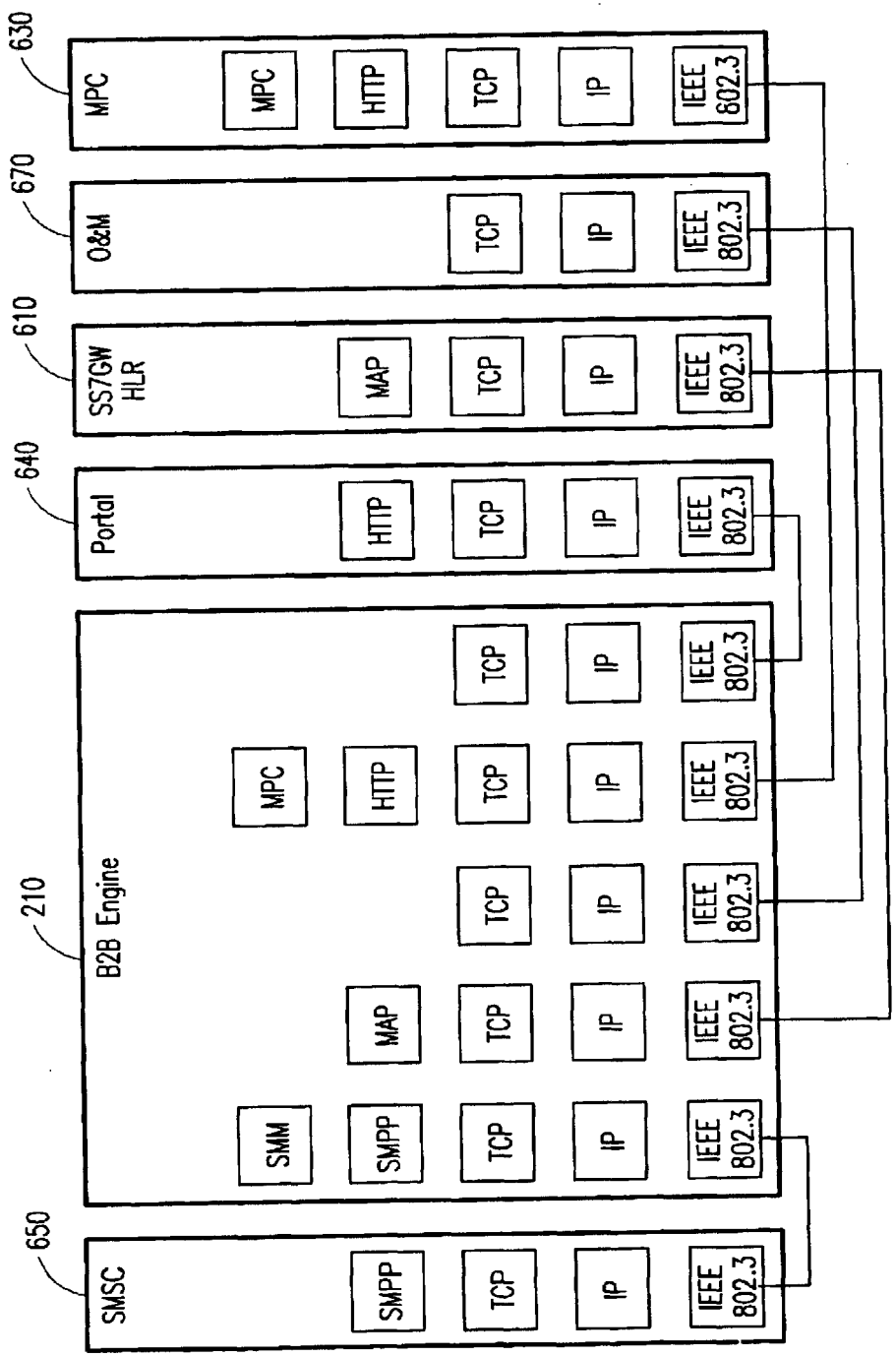
FIG. 17 illustrates a number of the protocols used in connection with the present invention, particularly between the B2B engine and several network nodes.

With reference to FIG. 17, the B2B engine 210, in addition to being connected to a portal 640 or to content aggregators, e.g., using a Transmission Control Protocol/Internet Protocol (TCP/IP), is also connected to various other nodes in the network. In general, it should be understood that these network nodes are typically used to gather realtime information about the subscribed user. The nodes in the network communicate with each other using standard protocols. These protocols are used to ease the means of communication between network nodes and to be compatible with the requisite standards. With further reference to FIG. 17, there is illustrated a preferred embodiment of the protocols used in the communication between the network nodes and the aforementioned B2B engine 210. It should be understood that the B2B engine 210 is preferably interfaced with all of the nodes in the network supplying event information, e.g., using a standard IEEE 802.3 connection.

The communication between the nodes are performed, as in other communication standards, using a layered structure. For example, all of the protocols employed utilize the Transmission Control Protocol/Internet Protocol (TCP/IP) protocol in their lower layers. However, in the upper layer each node uses a different protocol. For example, the B2B engine 210 communicates with the portal 640 using a HyperText Transfer Protocol (HTTP) commonly used in Internet communication. The HLR 610 uses a MAP protocol. The Mobile Positioning Center (MPC) 630 preferably uses a MPC protocol. A Short Messaging Service Center (SMSC) 650 preferably uses a Short Message Peer-to-Peer (SMPP) protocol. The particular protocols used are well known in the art and provide a means of interconnection between the different nodes in the network. However, it should be understood that a variety of other protocols could be used to support internodal communications.

Figure 18:
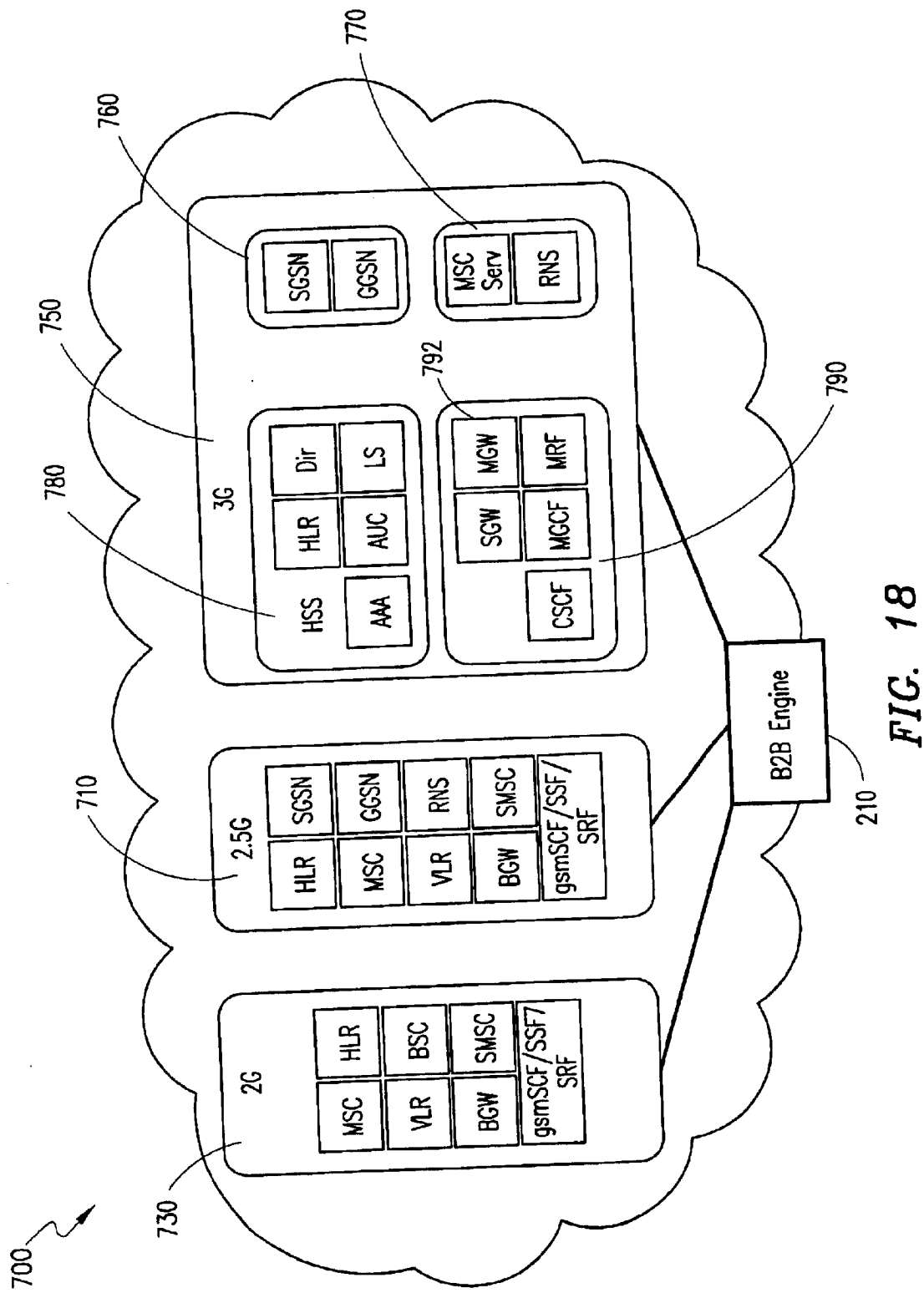
FIG. 18 illustrates an exemplary configuration and interworking of a B2B engine with different network architectures.

Referring now to FIG. 18, which illustrates the B2B engine interfacing with different network architectures. The B2B engine interfaces with a 2.5 G wireless telecommunications system 710 as shown in this figure and in previous FIG. 14. However, the B2B engine could be interfaced with other systems such as a second generation (2 G) wireless telecommunications operator system 730. It also can be interconnected with a 3 G wireless telecommunications system 750 which is currently under development. Although, the system architectures that are connected to the B2B engine are different, the same procedure could be used with each network node in the system, as was described hereinabove. For instance, the B2B engine could poll each of the network nodes in the 3 G wireless telecommunications system 750, or the network nodes could report any event to the B2B engine 210 regarding any update to the subscriber status. The engine described in the present invention could be used for numerous systems and the same procedure described hereinabove for the 2.5 G wireless telecommunications system could be applied to the 3 G wireless system, as well as other systems. The network nodes in the 3 G wireless system are separated in a call control network nodes 760, 770, 780 and connectivity control network nodes 790. The Media Gateways (MGW) 792 will be responsible for all the connectivity means, while the call control will be executed by servers in the control layer. The Control Layer will, in turn, interface to Application Gateways, not shown in the figure, allowing an unprecedented level of separation of services from specific fixed or mobile bearer technologies allowing for anyway, anywhere and anytime service delivery. The B2B engine has the ability to connect to different bearer technologies such as the GSM/EDGE, WCDMA and cdma2000. The B2B engine also interfaces with all the connectivity and control network nodes that keeps track and/or have record of the mobile subscriber. The network nodes, nonetheless, are preferably reprogrammed to include a mobility agent, as described hereinabove with reference to FIGS. 14 and 15.

Also the mobile operator described hereinabove is a GSM operator, it should be understood by one of ordinary skills in the art that the invention could be used for a PCS operator, a DAMPS operator or/and any existing mobile operator. Moreover, a single B2B engine could interconnect various mobile operators with various portals. The mobile operators could be of a different nature and using a different standard, e.g. a B2B engine could provide service for a PCS operator as well as a GSM operator, concurrently.

Moreover, 3 G mobile stations will also have the client application that will notify the B2B engine of any update to the user status, similar to what was described earlier for GSM phones having the client application programmed on the SIM card in the GSM network. The SIM card as described above could be any means in which the Mobile Equipment could have a programmable module on it capable of containing applications. The SIM card described hereinabove, could also be any programmable means that is capable of storing and performing certain functions, like having a fixed module in the mobile station being part of the Mobile Equipment (ME).

It should however be understood to one skilled in the art, that the portal and content aggregators are externally connected to the B2B engine, as described herein. However, the portal and/or content aggregators, in a preferred embodiment of the presently claimed invention, may be incorporated within the B2B engine as well. Meaning that the B2B engine could be in charge of gathering data content and selectively supplying the data content to the users.

It should be understood to one skilled in the art, that realtime information and realtime networks discussed with reference to the embodiments herein, represent the ideal timing of such networks and information disregarding any delays and/or processing in the network nodes and any other equipment. In general, a realtime network may be any network that functions in realtime or near realtime performance. Also, realtime information may be information that is substantially realtime or near realtime.

Figure 19:
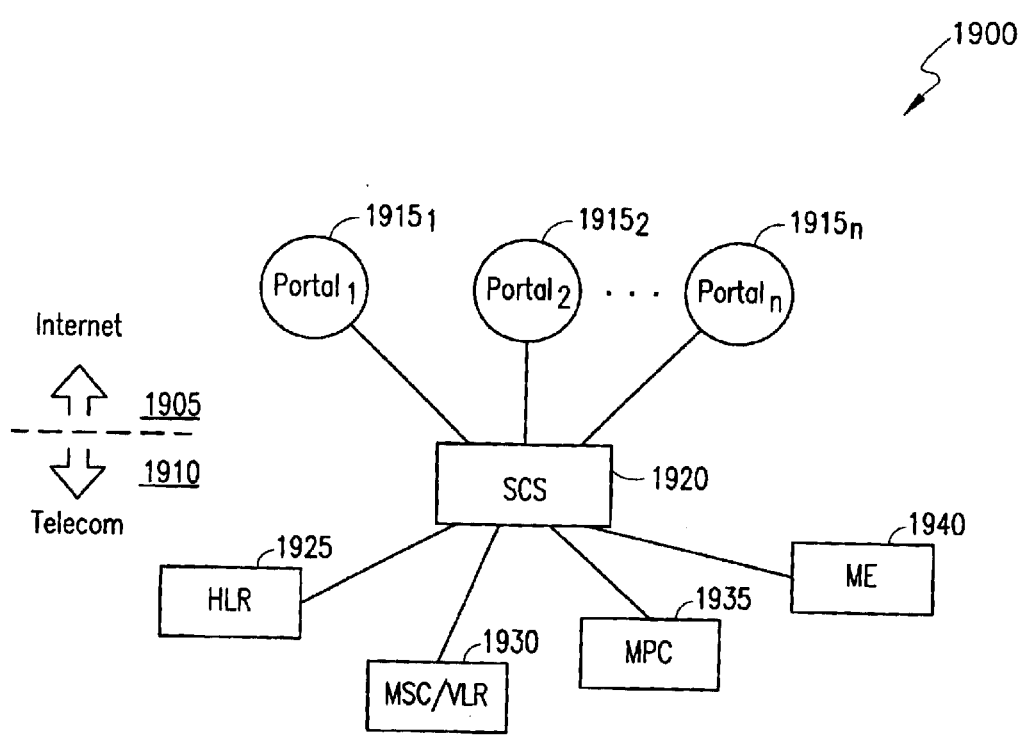
FIG. 19 illustrates another exemplary inter-network diagram in accordance with the present invention.

Referring now to FIG. 19, another exemplary inter-network diagram in accordance with the present invention is illustrated generally at 1900. The exemplary inter-network diagram 1900 is illustrated as having an internet portion 1905 and a telecommunications portion 1910. The service capability service (SCS) node 1920 bridges the internet portion 1905 and the telecommunications portion 1910. The SCS node 1920 (e.g., which may correspond to, for example, the B2B engine 210, 364, 410, 458, 520, and/or 660/662, etc. as described in exemplary manners hereinabove) enables one or more telecommunications network operators to provide value-added services to users by, for example, providing realtime information (e.g., user location, user status, etc.) to one or more portals$_{1 \ldots n}$ 1915$_{1 \ldots n}$. With regard to the internet portion 1905, the SCS 1920 is connected to one or more portals 1915 (e.g., which may correspond to, for example, the restaurant information 105, the weather information 110, the portals 115/362/420/468/502/640, the servers 260/262/264/266, and/or the content providers 272, etc. as described in exemplary manners hereinabove). The portals 1915 may correspond to, for example, internet web sites such as "Yahoo", other information providing services, computer applications, etc.

With regard to the telecommunications portion 1910, the SCS 1920 is connected to one or more telecommunications nodes and/or entities (e.g., which may correspond to, for example, the telecom systems 230, the realtime systems 270, and/or the telecommunications network systems 710/730/750, etc. as described in exemplary manners hereinabove). These telecommunications nodes and/or entities include an HLR 1925 (e.g., which may correspond to, for example, the HLR 610, and/or the HLR 654, etc. as described in exemplary manners hereinabove), an MSC/VLR 1930 (e.g., which may correspond to, for example, the MSC/VLR 615, the VLR 652, and/or the VLR 664, etc. as described in exemplary manners hereinabove), an MPC 1935 (e.g., which may correspond to, for example, the MPC 630, etc. as described in exemplary manners hereinabove), an ME 1940 (e.g., which may correspond to, for example, the MS 430, the MS 452, ME 512, ME 554, and/or the mobile 660, etc. as described in exemplary manners hereinabove), etc.

It should be noted that the exemplary inter-network diagram 1900 is simplified so as to facilitate explanation of the principles of the present invention without undue obfuscation. For example, the telecommunications nodes and/or entities to which the SCS 1920 is connected are exemplary only. More than one of each and more than a total four may be, and usually will be, connected thereto. Furthermore, other types of telecommunications nodes and/or entities, besides the illustrated HLR 1925, MSC/VLR 1930, MPC 1935, and ME 1940, may also be connected to the SCS 1920, such as an SMSC (e.g., the SMSC 650 from FIGS. 16–18). For example, the nodes illustrated in FIG. 18 may additionally and/or alternatively be connected to the SCS 1920. It should also be noted that the portals 1915 need not be part of or connected through/to the Internet.

Furthermore, it should be understood that the portals 1915 and the telecommunications nodes and/or entities 1925/1930/1935/1940 need not be connected directly to the SCS 1920, for there may be one or more intervening nodes, switches, servers, gateways, etc. disposed therebetween. Additionally, the connection between the portals 1915 and the telecommunications nodes and/or entities 1925/1930/1935/1940 and the SCS 1920 need not be composed entirely, or even partially, of wireline connections. For example, the connection between the ME 1940 and the SCS 1920 will ordinarily be at least partially realized using a wireless link. It should also be understood that the various components of the exemplary inter-network diagram 1900 need not be as discrete as illustrated in FIG. 19. For example, the SCS 1920 may be co-located with a VLR (or, alternatively, see FIG. 15 and related text), one or more portals 1915 may be co-located with the SCS 1920, one or more portals 1915 and the SCS 1920 may be implemented using a single computing platform/server, etc.

Figure 20A:
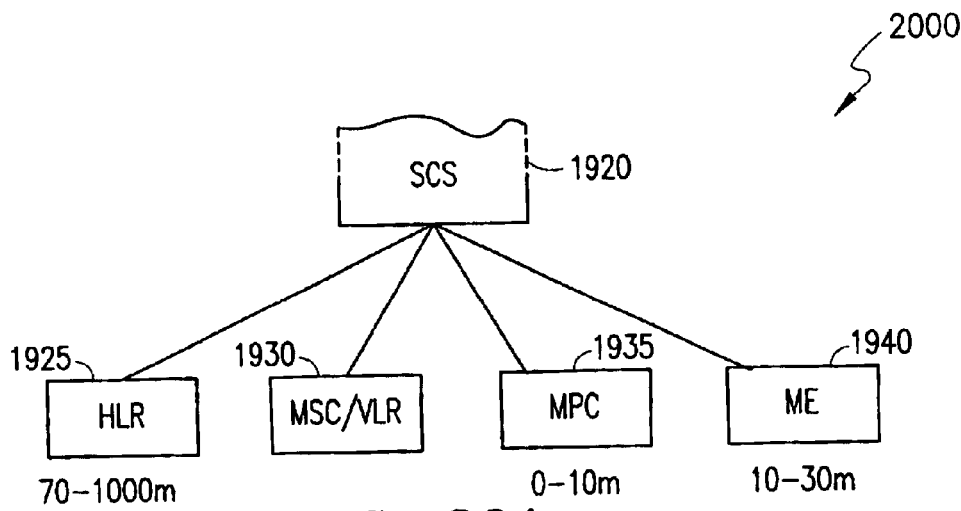
FIGS. 20A and 20B illustrate exemplary network aspects related to subscriber location in accordance with the present invention.
Figure 20B:
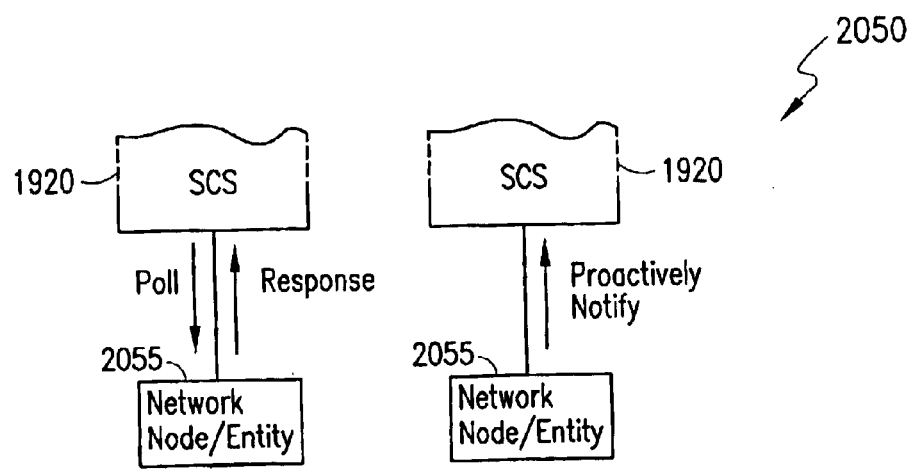

Referring now to FIGS. 20A and 20B, exemplary network aspects related to subscriber location in accordance with the present invention are illustrated generally at 2000 and 2050, respectively. The exemplary network aspects 2000 includes the SCS 1920 illustrated as connected to the HLR 1925, the MSC/VLR 1930, the MPC 1935, and the ME 1940. Each of these network nodes/entities has location information regarding the subscriber (unit), can access location information regarding the subscriber, can measure or cause to be measured the location of the subscriber, etc. It should be noted that the illustrated network nodes/entities is not exhaustive of those network nodes/entities that are related to subscriber location. Below certain network nodes/entities that are illustrated in the exemplary network aspects 2000 are approximate and exemplary accuracies by which the subscriber location may be determined by the given node. For example, the HLR 1925 may ascertain the location of the subscriber to within approximately 70–1000 meters (e.g., a location area), the ME 1940 may ascertain the location of the subscriber to within approximately 10–30 meters (e.g., a cell area), and the MPC 1935 may ascertain the location of the subscriber to within approximately 0–10 meters (e.g., using time of arrival (TOA)/time difference of arrival (TDOA) (optionally with triangulation or similar), using a GPS-based determination, etc.), etc. It can therefore be appreciated that the accuracy of the user location that is received by the SCS 1920 may be affected by the network node/entity selected to provide the user location.

Continuing now with FIG. 20B, other exemplary network aspects 2050 are illustrated in the context of providing location information to the SCS 1920 from a network node/entity 2055 (e.g., the HLR 1925, the MSC/VLR 1930, the MPC 1935, the ME 1940, the node/entities of FIG. 18, etc.). As illustrated on the left, the SCS 1920 may poll a network node/entity 2055 for location information, which prompts the network node/entity 2055 for a response having the location information. Alternatively, as illustrated on the right, the network node/entity 2055 may proactively notify the SCS 1920 of the location information. The proactive notifications may be accomplished using a logic module(s) (e.g., detachable or integrated hardware, software, firmware, some combination thereof, etc. that is appropriately coded or programmed) of the relevant network node/entity 2055.

These logic module(s) (e.g., which may correspond to, for example, the MA 656, the WAP toolkit 432/474, the SIM toolkit 434/454/516, the SIM 436/514/556, and/or the SIM application 552, etc. as described in exemplary manners hereinabove) may be set up to provide proactive notification(s) at, for example, regular intervals, at a location change, at a status change, etc. In certain, but not necessarily all, embodiment(s), the poll/response approach may be utilized for the HLR 1925 and the MPC 1935 while the proactive approach may be utilized for the ME 1940. Also in certain embodiment(s), a proprietary (e.g., proactive or non-proactive) approach and protocol may be utilized with the MSC/VLR 1930. It can therefore be appreciated that the location information may be provided to the SCS 1920 (i) regularly without repeated requests, (ii) on demand responsive to polling, (iii) using a proprietary approach/protocol, (iv) responsive to the occurrence of a predefined event, etc.

Figure 21:
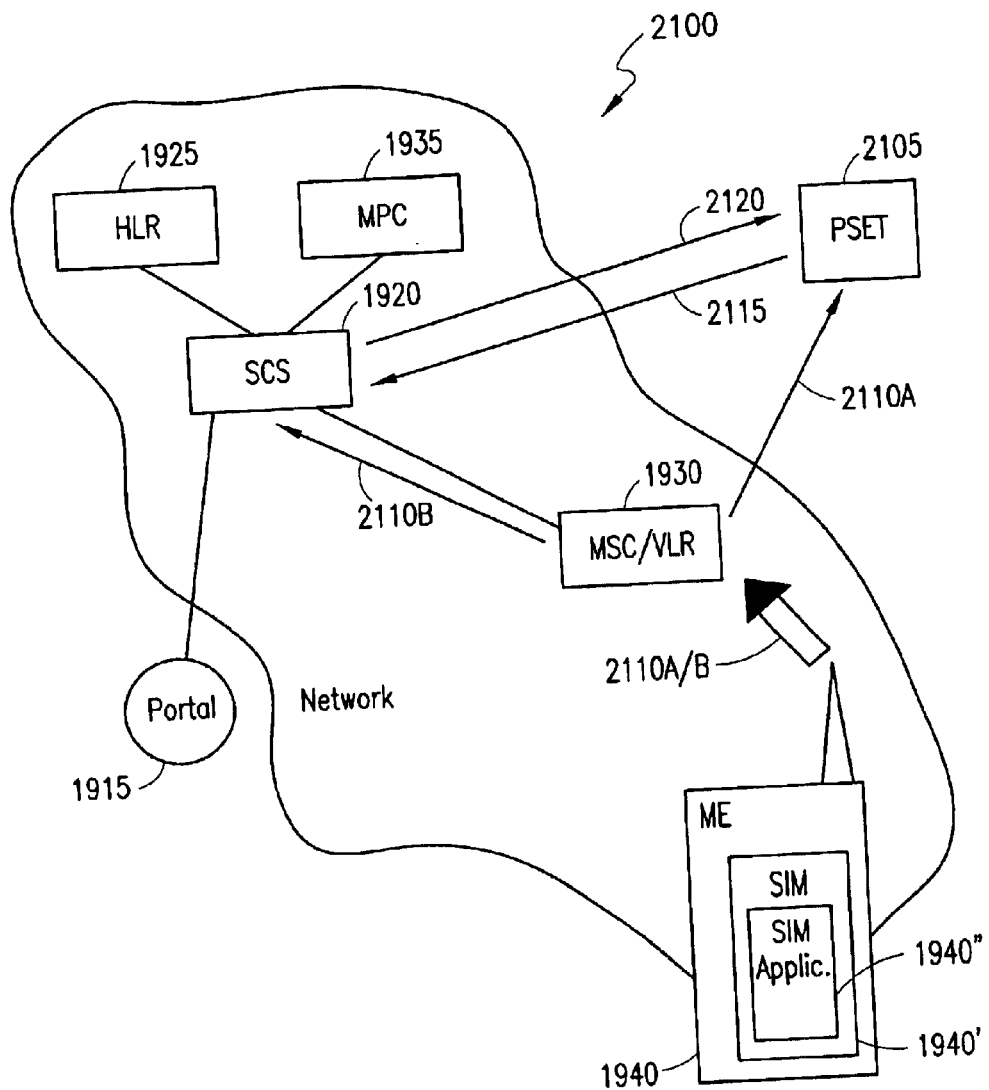
FIG. 21 illustrates an exemplary signal exchange for providing location information in accordance with the present invention.

Referring now to FIG. 21, an exemplary signal exchange for providing location information in accordance with the present invention is illustrated generally at 2100. The exemplary signal exchange 2100 occurs in the context of providing location information of an ME 1940 to, for example, a portal 1915 and/or a Police System Emergency Terminal (PSET) 2105. Before further describing aspects of the present invention, deficiencies of a conventional system should be addressed. In a conventional system, when an MS initiates an emergency call (e.g., by dialing/calling "911"), the network forwards the call to a PSET. The PSET then contacts an MPC with a location inquiry to determine the geographic origin of the emergency call. The MPC must then establish a connection to the MS through an MSC/VLR (and a Base Station Subsystem (BSS)). Once contacted, the MS responds via a reverse signaling chain that includes links through the BSS, the MSC/VLR, and the MPC, which is only then able to respond to the location inquiry from the PSET with the location of the MS. This conventional signaling chain, unfortunately, is lengthy and occupies significant signaling bandwidth of the network.

Continuing now with FIG. 21, in the exemplary signal exchange 2100 the ME 1940 detects that a preselected number has been dialed and/or is being called. This preselected number may be one of multiple numbers or a single number, and such a preselected number may be "911" for emergency calls. The detection of the preselected number may be accomplished, for example, using a SIM 1940' and/or a SIM application 1940". Alternatively, a different removable logic module or even an integrated logic module may be responsible for the detection. Once a preselected number has been detected and is being called, the ME 1940 initiates a dual communication 2110A/B. The dual communication 2110A/B is sent from the ME 1940 to the MSC/VLR 1930 (perhaps through a BSS (not explicitly shown in FIG. 21)).

The dual communication 2110A/B may be effectuated substantially simultaneously, or one portion may follow the other, with no, partial, or full overlapping. The voice call portion 2110A of the dual communication 2110A/B is forwarded from the MSC/VLR 1930 to the PSET 2105 (in an exemplary emergency (e.g., "911" based) call). The data call portion 2110B of the dual communication 2110A/B, on the other hand, is forwarded to an SCS 1920. The data call portion 2110B may include, for example, location information for the ME 1940 (e.g., at a cellular range (which the ME 1940 already knows), at a more-accurate range using a GPS-based or similar capability (if the ME 1940 is so equipped), etc.). The data call portion 2110B may additionally or optionally include an instruction to the SCS 1920 to begin or continue acquisition of a more-accurate location (e.g., via an MPC 1935). When the SCS 1920 receives the location information from the ME 1940 in the data call portion 2110B, the SCS 1920 therefore has a relatively-current location for the ME 1940, and the SCS 1920 can provide the location information to an inquiring node/entity.

After the PSET 2105 receives the voice call portion 2110A, the PSET 2105 "realizes" the need for location information on the originating ME 1940. Instead of needing to set up a signaling chain as in a conventional system, the PSET 2105 may send a location inquiry 2115 to the SCS 1920. The SCS 1920 may respond with a location information response 2120 using, e.g., location information previously received from the ME 1940 in the data call portion 2110B. (The SCS 1920 may alternatively use more-accurate and/or more-current location information if otherwise available.) The PSET 2105 can thus receive location information regarding an ME 1940 that has dialed an emergency number more quickly and with less signaling/fewer communications.

In alternative (although not necessarily exclusively so) embodiment(s), the preselected number need not be an emergency number, as mentioned above. The portal 1915 may establish a transaction with the SCS 1920 whereby one or more numbers (optionally including an emergency number such as "911" in addition to other important numbers like an "off limits" number) are selected and pushed to the ME 1940 as preselected numbers. For example, a parent may wish to know where (and when) a call is placed to a particular number (e.g., a troublesome teenager, an untrustworthy relative, etc.), so the parent uses the portal 1915 to establish these one or more numbers, which are then "downloaded" to the ME 1940, along with a corresponding detecting/notifying logic module if not already present with the ME 1940. When one of these preselected numbers is dialed and/or called, it is detected.

Consequently, responsive to such detection, the outgoing call from the ME 1940 (e.g., similar or analogous to the dual communication 2110A/B) may then include a first voice call portion destined for a node corresponding to the dialed number (not explicitly shown in FIG. 21) and a second data call portion (e.g., similar or analogous to the data call portion 2110B) destined for the SCS 1920. The second data call portion may include location information from the ME 1940 (e.g., via a cell ID, via GPS indicators, etc.) or a request to determine or further refine the location of the ME 1940. The location information of the ME 1940 may thereafter be provided to the portal 1915. The portal 1915 forwards the location information regarding the calling of the preselected number to the subscriber of the services of the portal (1915). Instead of, or in addition to, location information, temporal information, the dialed preselected number, etc. may be forwarded to the subscriber. Continuing with the above example, the parent is thereby enabled to proceed to retrieve his or her child.

Figure 22:
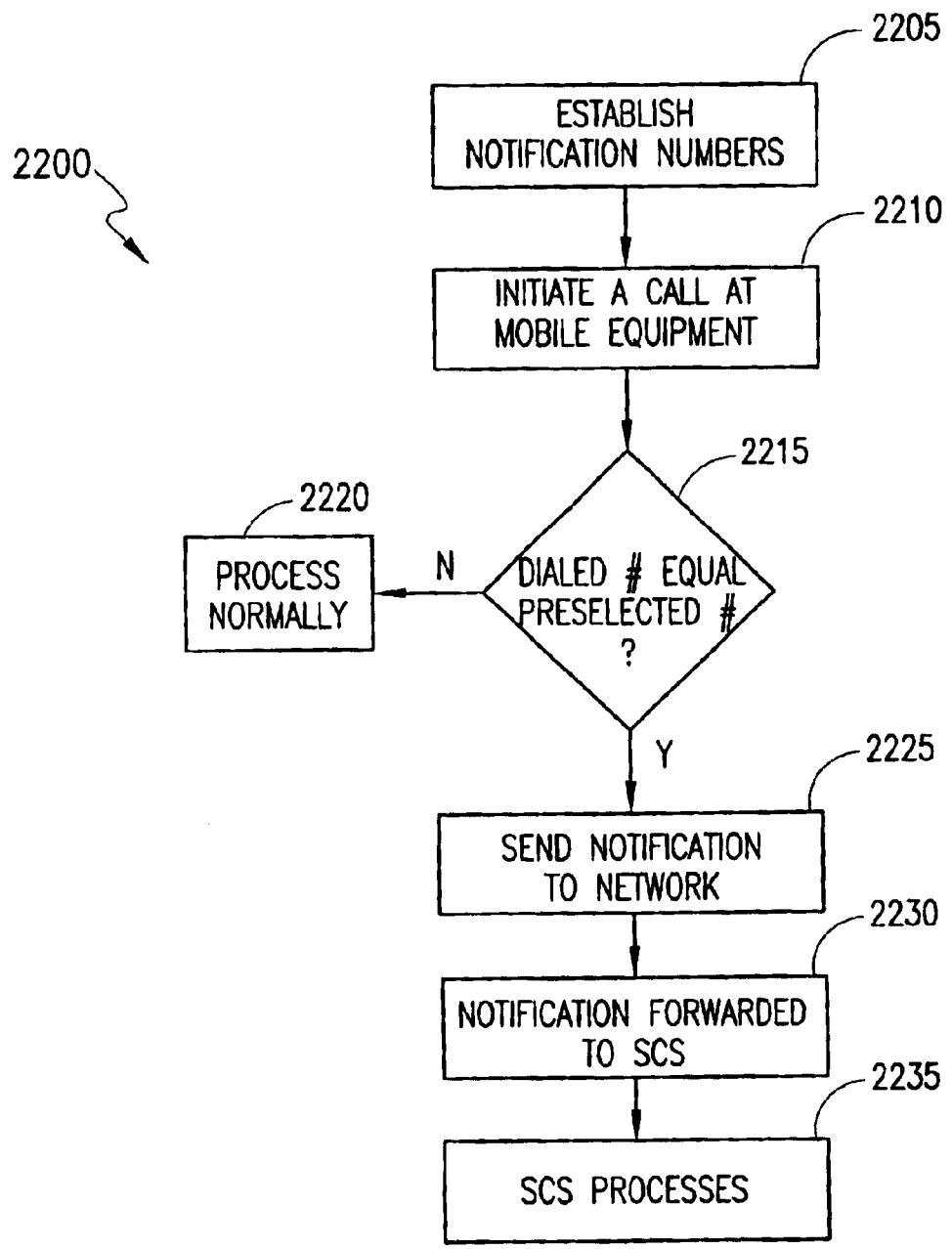
FIG. 22 illustrates an exemplary method in flowchart form for providing location information in accordance with the present invention.

Referring now to FIG. 22, an exemplary method in flowchart form for providing location information in accordance with the present invention is illustrated generally at 2200. The exemplary flowchart 2200 is directed to the providing of notification upon the calling of a preselected number; this notification may include information regarding the location of the calling ME. The preselected notification numbers are established (step 2205). They (one or more) may be established using and/or at the request of a portal via an SCS. Especially with regard to establishing an emergency number as a preselected number, the establishment may be effectuated at a manufacturing or activation facility for the ME or associated circuitry, including a SIM. In other words, the emergency number may be selectable/de-selectable using an, e.g., menu option as part of the basic programming of the phone.

After notification number establishment (at step 2205), the ME "waits" until a call is initiated thereon (step 2210). The dialed digits of the initiated call may be detected. A determination is then made as to whether the dialed/called number is equal to one of the one or more preselected number(s) (step 2215). If not, then the call is processed normally (step 2220). In other words, a normal voice call is set up. If, on the other hand, it is determined that the dialed/called number is equal to one of the one or more preselected number(s) (at step 2220), then a notification is sent to the network (step 2225). The notification is forwarded (e.g., within the network) to the SCS. The notification may include time of call, called number, and location information of the calling ME (e.g., from cell ID, GPS data, etc.). The notification may be sent, for example, using a data packet.

It should be noted that the corresponding voice call may be set up (e.g., to a general destination node, to a PSET, etc.) before, during, or after the occurrence and/or implementation of steps 2225 and 2230. Once the SCS receives the notification, the SCS appropriately processes the notification (step 2235). For example, the SCS can prepare for a communication exchange with the PSET (if the call is an emergency call) by awaiting a location information request, forwarding the known location of the ME automatically, contacting an MPC to ascertain a more-accurate location of the ME prior to the communication exchange, etc. As another example, the SCS can notify the relevant portal. The portal can handle the notification by sending an e-mail, an automated voice message/fax, etc. The portal, with the aid of the SCS, can also request that access to the network by the ME be curtailed.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile communications device for communicating with a wireless network, said wireless network including a voice switch for serving said communications device and a service control server (SCS) wherein said SCS connects said wireless network with non-telecommunication networks, comprising:
   a transmitter and receiver for communicating with said wireless network;
   a memory for storing at least one number accessible via said wireless network; and
   at least one logic module for
      detecting whether a call to the at least one number has been initiated and
      if the call to the at least one number is detected, initiating dual communication connections comprising a voice call connection to the voice switch and a data connection to the SCS for providing a notification message associated with said voice call connection to said at least one number.

2. The mobile communications device, according to claim 1, wherein at least one of said memory and said at least one logic module are realized in a mechanism removably attached to the mobile equipment.

3. The mobile communications device, according to claim 1, wherein at least one of said memory and said at least one logic module are realized in an integrated, non-detachable manner with respect to the mobile equipment.

4. The mobile communications device, according to claim 1, wherein said memory stores a plurality of numbers.

5. The mobile communications device, according to claim 1, wherein said at least one number comprises "911".

6. The mobile communications device, according to claim 1, wherein said data connection comprises a connectionless packet connection for forwarding information regarding the location of the mobile communications device.

7. The mobile communications device, according to claim 6, wherein the location information of the mobile communication device.

8. The mobile communications device, according to claim 6, further comprising a global positioning system (GPS) unit, and wherein the location information of the mobile communication device comprises GPS-related data.

9. The mobile communications device, according to claim 8, wherein said data-packet SMS message is transmitted by said transmitter towards the SCS, the SCS being connected to at least one of an Internet portal and an emergency service node.

10. The mobile communications device, according to claim 6, wherein said notification message comprises a short message service (SMS) message.

11. The mobile communications device, according to claim 10, wherein said SMS message comprises a called number, a time of calling, and a location of calling.

12. A method for providing notification from a mobile communications device communicating with a wireless network, said wireless network including a voice switch for serving said communications device and a service control server (SCS) wherein said SCS connects said wireless network with non-telecommunication networks, comprising the steps of:

establishing at least one number in the mobile communications device;
detecting call initiation at the mobile communications device;
ascertaining a destination number of the call initiation;
determining whether the destination number corresponds to the at least one number; and
if so, initiating dual communication connections comprising a voice call connection to the voice switch and a data connection to the SCS for providing a notification message associated with said voice call connection to said at least one number.

13. The method according to claim 12, wherein said step of establishing at least one number in the mobile communications device further comprises the step of establishing the at least one number using a portal.

14. The method according to claim 12, wherein said step of establishing at least one number in the mobile communications device further comprises the step of establishing the at least one number at a time of manufacturing.

15. The method according to claim 12, further comprising the step of transmitting a voice call request.

16. The method according to claim 12, further comprising the step of forwarding the notification message to the SCS.

17. The method according to claim 16, further comprising the steps of:

receiving, at the SCS, a location request from an emergency service node; and
providing, from the SCS to the emergency service node, location information, of the mobile communications device.

18. The method according to claim 17, wherein the location request is triggered by the call to the destination number and the location information is extracted from the notification message.

19. The method according to claim 17, wherein the location information is received from a mobile positioning center after the call to the destination number is received from the mobile communications device.

20. The method according to claim 16, further comprising the step of:

sending by the SCS to an Internet portal, the notification message, the notification message including a location indication of the mobile communications device.

21. A method for providing notification to a non-telecommunications node from a mobile communications device that is in communication with a wireless network, said wireless network including a voice switch for serving said communications device and a service control server (SCS) wherein said SCS connects said wireless network with non-telecommunication networks, comprising the steps of:

receiving a request to originate an outgoing call to a particular terminal number;
processing the outgoing call;
determining whether the particular terminal number matches a predetermined terminal number;
if yes, then
initiating a dual communication connection comprising a voice call connection to the voice switch and a data connection to the SCS for providing a notification message associated with said particular terminal number; and
responsive to the data connection, said SCS communicating the notification message to a non-telecommunication node for effectuating at least one subscriber feature.

22. A method for providing location information from a mobile communications device, that is in communication with a wireless network, said wireless network including a voice switch for serving said communications device and a service control server (SCS) wherein said SCS connects said wireless network with non-telecommunication networks, comprising the steps of:

establishing at least one emergency number in the mobile communications device;
detecting call initiation at the mobile communications device;
determining whether a destination number of the call initiation corresponds to the at least one emergency number and if so;
initiating a dual communication connection comprising a voice call connection to the voice switch for connecting to the at least one emergency number and a data connection to the SCS for providing a notification message, associated with said voice call connection, that includes location information associated with said mobile communications device.

23. The method according to claim 22, wherein the at least one emergency number corresponds to "911".

24. The method according to claim 23, further comprising the steps of:

receiving at the service control server a location request from an emergency service node;
responsively sending from the service control server the location information of the mobile communications device to the emergency service node.

* * * * *